United States Patent
Yanik et al.

(10) Patent No.: US 9,944,837 B2
(45) Date of Patent: Apr. 17, 2018

(54) CO-PROCESSING SOLID BIOMASS IN A CONVENTIONAL PETROLEUM REFINING PROCESS UNIT

(75) Inventors: Steve Yanik, Colorado Springs, CO (US); Paul O'Connor, Hoevelaken (NL); Robert Bartek, Centennial, CO (US)

(73) Assignee: Inaeris Technologies, LLC, Pasadena, TX (US)

( * ) Notice: Subject to any disclaimer, the term of this patent is extended or adjusted under 35 U.S.C. 154(b) by 762 days.

(21) Appl. No.: 13/617,289

(22) Filed: Sep. 14, 2012

(65) Prior Publication Data

US 2013/0068997 A1    Mar. 21, 2013

Related U.S. Application Data

(63) Continuation of application No. 12/867,214, filed as application No. PCT/US2009/049062 on Jun. 29, 2009, now Pat. No. 8,288,599.

(Continued)

(51) Int. Cl.
  *C09K 3/00* (2006.01)
  *C10G 1/08* (2006.01)
  (Continued)

(52) U.S. Cl.
  CPC ............... *C09K 3/00* (2013.01); *C10G 1/002* (2013.01); *C10G 1/08* (2013.01); *C10G 11/00* (2013.01);
  (Continued)

(58) Field of Classification Search
  None
  See application file for complete search history.

(56) References Cited

U.S. PATENT DOCUMENTS 2,412,879 A   12/1946   Fischer
3,961,913 A   6/1976   Brenneman et al.
(Continued)

FOREIGN PATENT DOCUMENTS

CA   1283880   5/1991
CA   2618000   2/2007
(Continued)

OTHER PUBLICATIONS

Bridgwater, A.V.; "Principles and Practice of Biomass Fast Pyrolysis Proesses for Liquids" Journal of Analytical and Applied Pyrolysis, Jul. 1999, vol. 51, pp. 3-22, p. 15, para 4 to p. 16, para 2: p. 18, para 2.
(Continued)

*Primary Examiner* — Tam M Nguyen
(74) *Attorney, Agent, or Firm* — Dunlap Codding, P.C.

(57) ABSTRACT

Preparing solid biomass particles for catalytic conversion includes agitating solid biomass particles and providing a biomass-catalyst mixture to a conventional petroleum refinery process unit. The biomass-catalyst mixture includes the solid biomass particles and a catalyst. Agitating solid biomass particles includes flowing a gas to provide a velocity to at least a portion of the solid biomass particles sufficient to reduce their sizes. Co-processing a biomass feedstock and a conventional petroleum feedstock includes liquefying at least a portion of a biomass-catalyst mixture and co-processing at least a portion of the liquefied biomass feedstock and a conventional petroleum feedstock in a conventional petroleum refinery process unit. The biomass feedstock includes a plurality of solid biomass particles and a catalyst, which is liquefied to produce a liquefied biomass feedstock.

14 Claims, 4 Drawing Sheets

Related U.S. Application Data (60) Provisional application No. 61/076,962, filed on Jun. 30, 2008.

(51) Int. Cl.
*C10G 11/00* (2006.01)
*C10G 11/18* (2006.01)
*C10G 1/00* (2006.01)

(52) U.S. Cl.
CPC ...... *C10G 11/18* (2013.01); *C10G 2300/1014* (2013.01); *C10G 2300/1037* (2013.01); *C10G 2300/4056* (2013.01); *C10G 2400/02* (2013.01); *C10G 2400/04* (2013.01); *C10G 2400/08* (2013.01); *C10G 2400/20* (2013.01); *C10G 2400/28* (2013.01); *Y02P 30/20* (2015.11)

(56) References Cited

U.S. PATENT DOCUMENTS

| | | |
|---|---|---|
| 4,064,018 A | 12/1977 | Choi |
| 4,072,274 A | 2/1978 | Syrjanen |
| 4,090,948 A | 5/1978 | Schwarzenbek |
| 4,118,281 A | 10/1978 | Yan |
| 4,147,593 A | 4/1979 | Frischmuth et al. |
| 4,153,514 A | 5/1979 | Garrett et al. |
| 4,207,167 A | 6/1980 | Bradshaw |
| 4,266,083 A | 5/1981 | Huang |
| 4,308,411 A | 12/1981 | Frankiewicz |
| 4,342,650 A | 8/1982 | Erickson et al. |
| 4,553,978 A | 11/1985 | Yvan |
| 4,589,927 A | 5/1986 | Allen et al. |
| 4,604,183 A * | 8/1986 | Edelson et al. ............... 208/420 |
| 4,678,860 A | 7/1987 | Kuester |
| 4,711,873 A | 12/1987 | Suzukamo et al. |
| 4,823,712 A | 4/1989 | Wormer |
| 4,851,601 A | 7/1989 | Fukuda et al. |
| 4,854,249 A | 8/1989 | Khinkis et al. |
| 4,874,507 A | 10/1989 | Whitlock |
| 4,987,114 A | 1/1991 | Suzukamo et al. |
| 4,992,605 A | 2/1991 | Craig et al. |
| 4,999,328 A | 3/1991 | Jain et al. |
| 5,064,527 A | 11/1991 | Singhai et al. |
| 5,097,088 A | 3/1992 | Fukao et al. |
| 5,102,628 A | 4/1992 | De Lasa |
| 5,115,084 A | 5/1992 | Himmelblau |
| 5,233,109 A | 8/1993 | Chow |
| 5,504,259 A | 4/1996 | Diebold et al. |
| 5,599,510 A | 2/1997 | Kaminsky et al. |
| 5,705,722 A | 1/1998 | Monnier et al. |
| 5,728,271 A | 3/1998 | Piskorz et al. |
| 5,792,340 A | 8/1998 | Freel et al. |
| 5,865,898 A | 2/1999 | Hotzapple et al. |
| 5,959,167 A | 9/1999 | Shabtai et al. |
| 5,961,786 A | 10/1999 | Freel et al. |
| 6,022,419 A | 2/2000 | Torget et al. |
| 6,069,012 A | 5/2000 | Kayser |
| 6,248,297 B1 | 6/2001 | Stine et al. |
| 6,485,774 B1 | 11/2002 | Bransby |
| 6,814,940 B1 | 11/2004 | Hiltunen et al. |
| 6,830,597 B1 | 12/2004 | Green |
| 6,971,594 B1 | 12/2005 | Polifka |
| 6,976,362 B2 | 12/2005 | Sheppard et al. |
| 7,044,999 B2 | 5/2006 | Bankstahl et al. |
| 7,202,389 B1 | 4/2007 | Brem |
| 7,262,331 B2 | 8/2007 | Van de Beld et al. |
| 7,312,370 B2 | 12/2007 | Pittman et al. |
| 7,341,973 B2 | 3/2008 | Flego et al. |
| 7,503,981 B2 | 3/2009 | Wyman et al. |
| 7,550,634 B2 | 6/2009 | Yao et al. |
| 7,872,165 B2 | 1/2011 | Bertoncini et al. |
| 7,955,401 B2 | 6/2011 | Ghonasgi et al. |
| 8,003,835 B2 | 8/2011 | Yanik et al. |
| 8,063,258 B2 | 11/2011 | Bartek et al. |
| 8,067,657 B2 | 11/2011 | Duarte Santiago et al. |
| 8,137,632 B2 | 3/2012 | Bartek et al. |
| 8,142,527 B2 | 3/2012 | Herskowitz et al. |
| 2004/0180971 A1 | 9/2004 | Inoue et al. |
| 2005/0114554 A1 | 5/2005 | Azadet et al. |
| 2006/0074132 A1 | 4/2006 | Allam et al. |
| 2007/0000177 A1 | 1/2007 | Hippo et al. |
| 2007/0213573 A1 | 9/2007 | Ross et al. |
| 2007/0225383 A1 | 9/2007 | Cortright et al. |
| 2008/0009055 A1 | 1/2008 | Lewnard |
| 2008/0022595 A1 | 1/2008 | Lemaire et al. |
| 2008/0076945 A1 | 3/2008 | Marker et al. |
| 2008/0149896 A1 | 6/2008 | Lenglet |
| 2009/0013601 A1 | 1/2009 | Mandich et al. |
| 2009/0013603 A1 | 1/2009 | Rolland |
| 2009/0056225 A1 | 3/2009 | Schinski |
| 2009/0090046 A1 | 4/2009 | O'Connor et al. |
| 2009/0093555 A1 | 4/2009 | Stites et al. |
| 2009/0139851 A1 | 6/2009 | Freel |
| 2009/0151251 A1 | 6/2009 | Manzer et al. |
| 2009/0158663 A1 | 6/2009 | Deluga et al. |
| 2009/0165378 A1 | 7/2009 | Agblevor |
| 2009/0227823 A1 * | 9/2009 | Huber .................... C10G 1/002 585/324 |
| 2009/0308787 A1 | 12/2009 | O'Connor et al. |
| 2010/0105970 A1 | 4/2010 | Yanik et al. |
| 2010/0113849 A1 | 5/2010 | Bartek et al. |
| 2010/0187162 A1 | 7/2010 | O'Connor et al. |
| 2010/0204378 A1 | 8/2010 | O'Connor |
| 2010/0205858 A1 | 8/2010 | O'Connor |
| 2010/0281759 A1 | 11/2010 | Yanik et al. |
| 2011/0094147 A1 | 4/2011 | Bartek et al. |
| 2011/0099888 A1 | 5/2011 | Bartek et al. |
| 2011/0114765 A1 | 5/2011 | Brady et al. |
| 2011/0114876 A1 | 5/2011 | Brady et al. |
| 2012/0022307 A1 * | 1/2012 | Yanik .................... C10G 1/002 585/240 |
| 2012/0137572 A1 * | 6/2012 | Bartek .................. C10G 11/18 44/307 |
| 2015/0102763 A1 * | 4/2015 | Spijker .................. H01M 6/50 320/104 |
| 2015/0240167 A1 * | 8/2015 | Kulprathipanja ...... C10G 1/002 585/240 |

FOREIGN PATENT DOCUMENTS

| | | |
|---|---|---|
| DE | 202006012176 | 12/2006 |
| EP | 1 719 811 | 8/2006 |
| EP | 1852466 | 11/2007 |
| EP | 1852490 | 11/2007 |
| EP | 1852492 | 11/2007 |
| EP | 1878783 | 1/2008 |
| EP | 1 892 280 | 2/2008 |
| EP | 1889870 | 2/2008 |
| EP | 2105456 | 9/2009 |
| EP | 2107100 | 10/2009 |
| WO | WO1981/01713 | 6/1981 |
| WO | WO2002/14040 | 2/2002 |
| WO | WO2002/83816 | 10/2002 |
| WO | WO2006/117006 | 11/2006 |
| WO | WO 2007/128798 | 11/2007 |
| WO | WO 2007/128798 A1 * | 11/2007 |
| WO | WO2007/128799 | 11/2007 |
| WO | WO2007/128800 | 11/2007 |
| WO | WO 2008/009643 | 1/2008 |
| WO | WO2008/011598 | 1/2008 |
| WO | WO2008/020047 | 2/2008 |
| WO | WO2008/052993 | 5/2008 |
| WO | WO2008/101949 | 8/2008 |
| WO | 2105486 | 9/2009 |
| WO | WO2009/118352 | 10/2009 |
| WO | WO2009118363 | 10/2009 |
| WO | WO2009/143017 | 11/2009 |
| WO | WO2010/002792 | 1/2010 |
| WO | WO2010/033789 | 3/2010 |
| WO | WO2010/068773 | 6/2010 |
| WO | WO2010/071677 | 6/2010 |
| WO | WO2010/075405 | 7/2010 |

(56) References Cited

FOREIGN PATENT DOCUMENTS

| WO | WO2010/075429 | 7/2010 |
|---|---|---|
| WO | WO2010111396 | 9/2010 |
| WO | WO2010/129654 | 11/2010 |
| WO | WO2010/135734 | 11/2010 |

OTHER PUBLICATIONS

Bridgwater, A.V., et al.; "Fast Pyrolysis Processes for Biomass" Renewable and Sustainable Energy Reviews 4 (2000) 1-73.
McKendry, Peter.; "Energy Production from Biomass"; Bioresource Technology, 83 (2002) pp. 37-46.
Wyman, et al.; "Coordinated Development of Leading Biomass Pretreatment Technologies" Bioresource Technology, 96 (2005) 1959-1966.
Lappas, A.A., et al. "Biomass Pyrolysis in a Circulating Fluid Bed Reactor for the Production of Fuels and Chemicals" Fuel IPC Science and Technology Press, Guildford, GB, vol. 81, No. 16, Nov. 1, 2002 (Nov. 1, 2011), pp. 2087-2095, XP004374414, ISSN: 0016-2361.
Marker, et al.; Integrated Hydropyrolysis and Hydroconversion (IH2) Process for Production of Gasoline and Diesel Fuel from Biomass, tcbiomass2009, The International Conference on Thermochemical Conversion Science, Sep. 18, 2009, pp. 1-25, Gas Technology Institute.
Sato T., et al.; "Development of Liquefaction Technique of Pulverized Ligneous Biomass Powder," American Institute of Chemical Engineers Annual Meeting, 2004, pp. 2649-2656.
Geldart D.; "Types of gas fluidization," Powder Technology, 7(5):285-292, (1973).
Huber, et al.; "Synthesis of Transportation Fuels from Biomass: Chemistry Catalysts and Engineering" Chem. Rev.,: Chemical Reviews, Sep. 2006, vol. 106, No. 9, pp. 4044-4098, 4047-4048, 4061-4063, 4085, 4092-4093, XP002490759.

* cited by examiner

CO-PROCESSING SOLID BIOMASS IN A CONVENTIONAL PETROLEUM REFINING PROCESS UNIT

CROSS REFERENCE TO RELATED APPLICATIONS

This application is a continuation of U.S. Ser. No. 12/867,214, filed on Oct. 14, 2011, now U.S. Pat. No. 8,288,599 which claims the benefit of International Application No. PCT/US2009/49062, filed Jun. 29, 2009, which claims the benefit of U.S. Provisional Application Ser. No. 61/076,962, filed Jun. 30, 2008. The entire contents of which are expressly incorporated by reference herein.

FIELD OF THE INVENTION

The invention relates to producing fuels and specialty chemicals from biomass using conventional petroleum refining processes. The invention relates more particularly to preparing solid biomass for catalytic conversion and to co-processing a biomass feedstock and a conventional petroleum feedstock into fuels and specialty chemicals from biomass in modified and/or retrofitted conventional petroleum refining process units.

BACKGROUND OF THE INVENTION

Biomass, in particular biomass of plant origin, is recognized as an abundant potential source of fuels and specialty chemicals. See, for example, "Energy production from biomass," by P. McKendry—Bioresource Technology 83 (2002) p 37-46 and "Coordinated development of leading biomass pretreatment technologies" by Wyman et al., Bioresource Technology 96 (2005) 1959-1966. Refined biomass feedstock, such as vegetable oils, starches, and sugars, can be substantially converted to liquid fuels including biodiesel (e.g., methyl or ethyl esters of fatty acids) and ethanol. However, using refined biomass feedstock for fuels and specialty chemicals can divert food sources from animal and human consumption, raising financial and ethical issues.

Alternatively, inedible biomass can be used to produce liquid fuels and specialty chemicals. Examples of inedible biomass include agricultural waste (such as bagasse, straw, corn stover, corn husks, and the like) and specifically grown energy crops (like switch grass and saw grass). Other examples include trees, forestry waste, such as wood chips and saw dust from logging operations, or waste from paper and/or paper mills. In addition, aquacutural sources of biomass, such as algae, are also potential feedstocks for the producing fuels and chemicals. Inedible biomass generally includes three main components: lignin, amorphous hemicellulose, and crystalline cellulose. Certain components (e.g., lignin) can reduce the chemical and physical accessibility of the biomass, which can reduce the susceptibility to chemical and/or enzymatic conversion.

Producing fuels and specialty chemicals from biomass can require specialized conversion processes and/or refineries, which are distinct from and incompatible with conventional petroleum-based conversion processes and refineries. Thus, the wide-spread use and implementation of biomass to produce fuels and specialty faces many challenges, because large-scale production facilities are not widely available and are expensive to build. Furthermore existing processes can require extreme conditions (e.g., high temperature and/or pressure, which increases capital and operating costs), require expensive catalysts, suffer low conversion efficiency (e.g., incomplete conversion or inability to converts lingo- and hemi-cellulosic material), and/or suffer poor product selectivity.

BRIEF SUMMARY OF THE INVENTION

In various embodiments the invention includes methods, apparatuses, kits, and compositions for converting cellulosic (e.g., including ligno- and hemi-cellulosic) material in biomass (e.g., including inedible and inedible portions) into fuels and/or specialty chemicals under conditions that can mitigate equipment cost, energy cost, and/or degradation or undesirable reaction of conversion product. Examples of fuels include light gases (ethane, propane, butane), naphtha, and distillates (jet fuel, diesel, heating oil). Examples of chemicals include light olefins (ethylene, propylene, butylenes), acids (like formic and acetic), aldehydes, alcohols (ethanol, propanol, butanol, phenols), ketones, furans, and the like. For example, the technology includes preparing solid biomass particles for catalytic conversion, which can improve conversion of the biomass into fuels and/or specialty chemicals in conventional petroleum refining processes (e.g., known petrochemical refining units). The technology also includes adapting existing refinery processes for processing biomass (e.g., change operating parameters, catalyst, and feedstock), retrofitting existing refinery process units for processing biomass (e.g., adding an extra riser for biomass catalytic cracking or adding a solid biomass feeder system to introduce biomass), and constructing new, purpose-built biomass reactors (e.g., employ commercially available conventional reactor components). Thus, the methods, apparatuses, kits, and compositions can reduce the cost and increase the availability of fuel and/or specialty chemicals derived from biomass. Preparation can have a synergistic effect, reducing the temperature necessary for catalytic or pyrolytic conversion of the biomass and/or increasing the conversion efficiency of the biomass, as well as facilitating processing in conventional refining units.

In one aspect, the technology features a method for preparing solid biomass particles for catalytic or thermal conversion. The method includes agitating solid biomass particles by flowing a gas to provide a velocity to at least a portion of the solid biomass particles sufficient to reduce their sizes, so that the plurality of solid biomass particles are substantially characterized by an average size between about 50 and about 70 microns and individual sizes between about 5 and about 250 microns. The method also includes providing a biomass-catalyst mixture including the solid biomass particles and a catalyst to a conventional refinery unit. Alternatively, the plurality of solid biomass particles can be substantially characterized by individual sizes below about 1500 microns.

In another aspect, the technology features an apparatus for preparing solid biomass particles for catalytic conversion. The apparatus includes a conditioning vessel for conditioning solid biomass particles, the conditioning vessel includes a gas source for flowing a gas to provide a velocity to at least a portion of the solid biomass particles sufficient to reduce their sizes, so that the plurality of solid biomass particles are substantially characterized by an average size between about 50 and about 70 microns and individual sizes between about 5 and about 250 microns. The apparatus also includes a system for supplying a biomass-catalyst mixture including the solid biomass particles and a catalyst to a conventional petroleum refinery process unit. Alternatively, the plurality of solid biomass particles can be substantially characterized by individual sizes below about 1500 microns.

In still another aspect, the technology features a method for co-processing a biomass feedstock and a conventional petroleum feedstock. The method includes liquefying at least a portion of a biomass-catalyst mixture including a plurality of solid biomass particles and a catalyst, where the plurality of solid biomass particles are substantially characterized by an average size between about 50 and about 70 microns and individual sizes between about 5 and about 250 microns, to produce a liquefied biomass feedstock. The method also includes co-processing at least a portion of the liquefied biomass feedstock and a conventional petroleum feedstock in a conventional petroleum refinery process unit. Alternatively, the plurality of solid biomass particles can be substantially characterized by individual sizes below about 1500 microns.

In yet another aspect, the technology features an apparatus for co-processing a biomass feedstock and a conventional petroleum feedstock. The apparatus has a first conventional refinery process unit including a biomass-catalyst mixture. The biomass-catalyst mixture includes a plurality of solid biomass particles and a catalyst, where the plurality of solid biomass particles are substantially characterized by an average size between about 50 and about 70 microns and individual sizes between about 5 and about 250 microns, and where the first conventional petroleum refinery process unit is adapted for liquefying at least a portion of the biomass-catalyst mixture to produce a liquefied biomass feedstock. The apparatus also includes a second conventional petroleum refinery process unit comprising the liquefied biomass feedstock and a conventional petroleum feedstock, where the second conventional petroleum refinery process unit is adapted for co-processing at least a portion of the liquefied biomass feedstock and a conventional petroleum feedstock. Alternatively, the plurality of solid biomass particles can be substantially characterized by individual sizes below about 1500 microns.

In another aspect, the technology features a biomass feedstock for co-processing with a conventional petroleum feedstock in a conventional petroleum refinery unit. The biomass feedstock consists essentially of a biomass-catalyst mixture comprising a plurality of solid biomass particles and a catalyst. The plurality of solid biomass particles are substantially characterized by an average size between about 50 and about 70 microns and individual sizes between about 5 and about 250 microns. Alternatively, the plurality of solid biomass particles can be substantially characterized by individual sizes below about 1500 microns.

In still another aspect, the technology features a biomass-conventional petroleum feedstock for co-processing in a conventional petroleum refinery process unit. The biomass-conventional feedstock consists essentially of a liquefied biomass feedstock and a conventional petroleum-based feedstock. The liquefied biomass feedstock is derived from liquefying a biomass-catalyst mixture comprising a plurality of solid biomass particles and a catalyst where the plurality of solid biomass particles are substantially characterized by an average size between about 50 and about 70 microns and individual sizes between about 5 and about 250 microns. Alternatively, the plurality of solid biomass particles can be substantially characterized by individual sizes below about 1500 microns.

In yet another aspect, the technology features a method for retrofitting a conventional petroleum refinery for co-processing a biomass feedstock and a conventional petroleum-based feedstock. The method includes providing a conditioning vessel for conditioning solid biomass particles. The conditioning vessel includes a gas source for flowing a gas to provide a velocity to at least a portion of the solid biomass particles sufficient to reduce their sizes, so that the plurality of solid biomass particles are substantially characterized by an average size between about 50 and about 70 microns and individual sizes between about 5 and about 250 microns. The method also includes providing a system for supplying a biomass-catalyst mixture including the solid biomass particles and a catalyst to a conventional petroleum refinery process unit. Alternatively, the plurality of solid biomass particles can be substantially characterized by individual sizes below about 1500 microns.

In another aspect, the technology includes a kit for retrofitting a petroleum refinery for co-processing a biomass feedstock and a conventional petroleum-based feedstock. The kit includes a conditioning vessel for conditioning solid biomass particles. The conditioning vessel includes a gas source for flowing a gas to provide a velocity to at least a portion of the solid biomass particles sufficient to reduce their sizes, so that the plurality of solid biomass particles are substantially characterized by an average size between about 50 and about 70 microns and individual sizes between about 5 and about 250 microns. The kit also includes a system for supplying a biomass-catalyst mixture comprising the solid biomass particles and a catalyst to a conventional petroleum refinery process unit. Alternatively, the plurality of solid biomass particles can be substantially characterized by individual sizes below about 1500 microns.

In other examples, any of the aspects above, or any method, apparatus, or composition of matter described herein, can includes one or more of the following features.

In various embodiments, methods include liquefying at least a portion of the biomass-catalyst mixture in a first conventional petroleum refinery process unit, to produce a liquefied biomass feedstock and co-processing at least a portion of the liquefied biomass feedstock and a conventional petroleum-based feedstock in a second conventional petroleum refinery process unit.

In some embodiments, a catalyst includes a solid particulate catalyst and the biomass-catalyst mixture comprises at least a portion of the catalyst mechano-chemically interacting with at least a portion of the solid biomass particles. The catalyst can be capable of being at least partly dissolved or suspended in a liquid and the biomass-catalyst mixture can include at least a portion of the catalyst impregnating at least a portion of the solid biomass particles.

In certain embodiments, the catalyst includes at least one of a group I element, group II element, Na, K, Ca, Fe, Mg, $Al_2O_3$, inorganic oxide, catalytic clay, silica, and catalytic metal or metal compound. The biomass-catalyst mixture can include an inorganic particulate material.

In various embodiments, methods includes kneading the solid biomass particles and the catalyst, to make at least a portion of the solid biomass particles accessible to at least a portion of the catalyst before separation, after separation, or both before and after separation.

In some embodiments, the solid biomass feedstock includes non-edible biomass. The solid biomass feedstock can include a terrestrial or aquatic cellulosic material. The solid biomass feedstock can include at least one of bagasse, straw, corn stover, corn husks, switch grass, saw grass, trees, forestry waste, wood chips, saw dust, paper waste and algae.

Plant matter can be processed at a location in close proximity to an agricultural site used to produce such plant matter, to produce the solid biomass particles.

In certain embodiments, the velocity is selected from the group consisting of: between about 10 and about 20 m/s; between about 20 and about 30 m/s; between about 30 and about 40 m/s; between about 40 and about 50 m/s; between about 50 and about 60 m/s; between about 60 and about 70 m/s; between about 70 and about 80 m/s; between about 80 and about 90 m/s; and between about 90 and about 100 m/s. The velocity can be about 10 m/s, about 20 m/s, about 30 m/s, about 40 m/s, about 50 m/s, about 60 m/s, about 70 m/s, about 80 m/s, about 90 m/s, or about 100 m/s. The velocity can be greater than about 10 m/s, about 20 m/s, about 30 m/s, about 40 m/s, about 50 m/s, about 60 m/s, about 70 m/s, about 80 m/s, about 90 m/s, or about 100 m/s.

In various embodiments, contacting the solid biomass particles and the catalyst to produce the biomass-catalyst mixture occurs after agitating. Contacting the solid biomass particles and the catalyst to produce the biomass-catalyst mixture can occur before agitating. Agitating the solid biomass particles can include agitating the biomass-catalyst mixture.

In some embodiments, the gas includes one or more of air, steam, flue gas, dry gas, wet gas, carbon dioxide, carbon monoxide, hydrogen, hydrocarbons, and methane.

In certain embodiments, agitating facilitates formation of a mechano-chemical interaction between at least a portion of the catalyst and at least a portion of the solid biomass particles.

In various embodiments, methods include dewatering the solid biomass particles. Dewatering the solid biomass particles can occur at a temperature below about 150° C., to mitigate undesired conversion of the biomass.

In some embodiments, methods include providing the solid biomass particles or the solid biomass particles and the catalyst to a de-oxygenating reactor (or a section of an existing petroleum refinery process unit), to produce a de-oxygenated fraction. The method can include (i) providing the solid biomass particles or the solid biomass particles and the catalyst to a de-oxygenating reactor, to produce a de-oxygenated fraction and (ii) providing at least a portion of the de-oxygenated fraction to a conventional petroleum refinery process unit or refined petroleum product stream.

In certain embodiments, fresh catalyst is added after the agitating and the providing steps. Adding fresh catalyst after the agitating and the providing steps can modulate a temperature in at least one petroleum refinery process unit.

In various embodiments, methods, apparatuses, and/or kits include a first conventional petroleum refinery process unit adapted for liquefying at least a portion of the biomass-catalyst mixture, to produce a liquefied biomass feedstock. A second conventional petroleum refinery process unit adapted for co-processing at least a portion of the liquefied biomass feedstock and a conventional petroleum-based feedstock can be included.

In some embodiments, the methods, apparatuses, and/or kits include a disintegrator for processing plant matter at a location in close proximity to an agricultural site used to produce such plant matter, to produce the solid biomass particles. The disintegrator can be selected from the group consisting of a fragmenter, fractionator, granulator, pulverizer, chipper, chopper, grinder, shredder, mincer, mill and a crusher.

In certain embodiments, methods, apparatuses, and/or kits include separating a fraction of the liquefied biomass feedstock for fuel blending, petrochemicals, or petrochemical feeds. A separated fraction of a product of the co-processing can be used for fuel blending, petrochemicals, or petrochemical feeds.

In various embodiments, at least one of the first reaction vessel and the second reaction vessel can include a riser, transport reactor, or riser cracker. At least one of the first and second conventional petroleum refinery process units can be a fluid catalytic cracking unit, a fluid and/or delayed coking unit, fluid catalytic cracking pretreater unit, resid HT unit, deasphalting unit, lube oil HT unit, hydrocracker, ethylene polymerization unit, propylene polymerization unit, ebullating bed. A fixed bed unit can be proceeded by an ebullating bed unit, where spent catalyst can be removed and replaced with fresh catalyst.

In some embodiments, liquefying at least a portion of a solid biomass feedstock includes operating the first reaction vessel at a temperature selected from the group consisting of about 450° C., about 425° C., about 400° C., about 375° C., about 350° C., about 325° C., about 300° C., about 275° C., about 250° C., about 225° C., about 200° C., about 175° C., about 150° C., between about 450 and 425° C., between about 425 and 400° C., between about 400 and 375° C., between about 375 and 350° C., between about 350 and 325° C., between about 325 and 300° C., between about 300 and 275° C., between about 275 and 250° C., between about 250 and 225° C., between about 225 and 200° C., between about 200 and 175° C., and between about 175 and 150° C. The first reactor can be heated by recycled catalyst.

In certain embodiments, methods, apparatuses, and/or kits include separating at least a portion of the liquefied biomass feedstock into a hydrocarbon fraction for co-processing with the conventional petroleum feedstock and an oxygenated fraction. At least a portion of the liquefied biomass feedstock can be de-oxygenated. Oxygen in the processed biomass feedstock can be retained in a product stream, without substantially converting the oxygen to $H_2O$, CO, or $CO_2$. Oxygen in the processed biomass feedstock can be selectively converted to $H_2O$, CO, or $CO_2$ by controlling at least one of catalyst type and reaction temperature.

In various embodiments, methods, apparatuses, and/or kits include a heat exchanger, to heat or cool at least one of the petroleum refinery process units or recycled catalyst, to modulate a temperature of at least one of the petroleum refinery process units. A fresh catalyst feed, for adding fresh catalyst after the agitating and the providing steps, can modulate a temperature in at least one petroleum refinery process unit.

In some embodiments, methods, apparatuses, and/or kits include (i) a third conventional petroleum refinery process unit, where the first, second, and third units can operate at independently selected temperatures and catalysts, to optimize product selectivity and (ii) a product separation system, where a product from each unit can be independently separated into one or more of a fraction to be recycled for further processing, a fraction to used as a feedstock for a conventional petroleum refinery process unit, and a fraction to be used as a specialty chemical. The third conventional petroleum refinery process unit can be associated with a third feed system that provides a second conventional petroleum feedstock to the refinery process unit for further blending and/or processing.

In certain embodiments, the catalyst includes a solid particulate catalyst and the biomass-catalyst mixture includes at least a portion of the catalyst mechano-chemically interacting with at least a portion of the solid biomass particles. The catalyst can include a catalyst capable of being at least partly dissolved or suspended in a liquid and the biomass-catalyst mixture can include at least a portion of the catalyst impregnating at least a portion of the solid biomass particles. The biomass feedstock of claim can include an inorganic particulate material.

In various embodiments, the liquefied biomass feedstock is between about 1 and about 100 wt % of the biomass-conventional petroleum feedstock. The liquefied biomass feedstock can be between about 5 and about 50 wt % of the biomass-conventional petroleum feedstock. The liquefied biomass feedstock can be between about 10 and about 20 wt % of the biomass-conventional petroleum feedstock.

In some embodiments, methods, apparatuses, and/or kits include a first conventional refinery unit adapted for liquefying the biomass-catalyst mixture to produce a liquefied biomass feedstock. Methods, apparatuses, and/or kits can include retrofitting a preexisting first conventional petroleum refinery unit for liquefying the biomass-catalyst mixture to produce a liquefied biomass feedstock. Methods, apparatuses, and/or kits can also include retrofitting a preexisting second conventional petroleum refinery unit for co-processing at least a portion of a liquefied biomass feedstock and a conventional feedstock. Methods, apparatuses, and/or kits can also include integrating the conditioning vessel and the system into the conventional petroleum refinery for co-processing the biomass feedstock and the conventional feedstock. Methods, apparatuses, and/or kits can also include providing a first conventional refinery unit adapted for liquefying the biomass-catalyst mixture to produce a liquefied biomass feedstock.

In certain embodiments, methods, apparatuses, and/or kits can include instructions. Instructions can be for retrofitting a preexisting first conventional petroleum refinery unit for liquefying the biomass-catalyst mixture to produce a liquefied biomass feedstock. Instructions can be for retrofitting a preexisting second conventional petroleum refinery unit for co-processing at least a portion of a liquefied biomass feedstock and a conventional petroleum feedstock.

In various embodiments, the method includes providing the biomass-catalyst mixture using a first feed system and providing the conventional petroleum feedstock using a second feed system. The method can include providing the portion of the liquefied biomass feedstock to the conventional refinery unit using a first feed system and providing the conventional petroleum feedstock to the conventional refinery unit using a second feed system. Liquefying at least a portion of a solid biomass feedstock can include operating the first reaction vessel at a temperature between about 450 and 250° C. In one embodiment, the method includes providing a second petroleum feedstock and processing a product of co-processing the portion of the liquefied biomass feedstock and the conventional petroleum feedstock in a conventional refinery unit. A second petroleum feedstock can be provided by a third feed system.

In some embodiments, the apparatus includes a first feed system providing the portion of the biomass-catalyst mixture to the first conventional refinery unit and a second feed system providing the conventional petroleum feedstock to the second conventional refinery unit. The apparatus can include a first feed system providing the portion of the liquefied biomass feedstock to the conventional refinery unit and a second feed system providing the conventional petroleum feedstock to the conventional refinery unit. The first conventional petroleum refinery process unit can operates at a temperature between about 450 and 250° C.

In certain embodiments, the plurality of solid biomass particles are substantially characterizeed by individual sizes below about 1000 microns. The plurality of solid biomass particles can be substantially characterized by individual sizes below about 500 microns.

Other aspects and advantages of the technology will become apparent from the following drawings and description, all of which illustrate principles of the technology, by way of example only.

BRIEF DESCRIPTION OF THE DRAWINGS

The advantages of the technology described above, together with further advantages, may be better understood by referring to the following description taken in conjunction with the accompanying drawings. The drawings are not necessarily to scale, emphasis instead generally being placed upon illustrating the principles of the technology.

DETAILED DESCRIPTION OF THE TECHNOLOGY

The technology provides methods, apparatuses, kits, and compositions using conventional petroleum refinery process units for converting cellulosic material in biomass into fuels and/or specialty chemicals under conditions that can mitigate equipment cost, energy cost, and/or degradation or undesirable reaction of conversion product.

The technology features methods and apparatuses for preparing solid biomass particles for catalytic conversion. First, the methods and apparatus provide for agitating solid biomass particles to reduce their sizes. Second, the methods and apparatus provide for providing a biomass-catalyst mixture including the solid biomass particles and a catalyst to a conventional petroleum refinery unit. The technology also provides for co-processing a biomass feedstock and a conventional petroleum feedstock. First, the methods and apparatus provide for liquefying at least a portion of a biomass-catalyst mixture, to produce a liquefied biomass feedstock. Second, the methods and apparatus provide for co-processing at least a portion of the liquefied biomass feedstock and a conventional petroleum feedstock in a conventional petroleum refinery process unit.

The technology features biomass feedstock for co-processing with a conventional petroleum feedstock in a conventional petroleum refinery unit. The biomass feedstock consists essentially of a biomass-catalyst mixture comprising a plurality of solid biomass particles and a catalyst. The plurality of solid biomass particles are substantially characterized by an average size between about 50 and about 70 microns and individual sizes between about 5 and about 250 microns. The technology also features biomass-conventional petroleum feedstock for co-processing in a conventional petroleum refinery unit, which consists essentially of a liquefied biomass feedstock and a conventional petroleum feedstock.

The technology features methods for retrofitting, and retrofit kits for, a conventional petroleum refinery for co-processing a biomass feedstock and a conventional petroleum feedstock. The methods and kits include a conditioning vessel for conditioning solid biomass particles. The conditioning vessel includes a gas source for flowing a gas to provide a velocity to at least a portion of the solid biomass particles sufficient to reduce their sizes. The methods and kits also include a system for supplying a biomass-catalyst mixture including the solid biomass particles and a catalyst to a conventional petroleum refinery unit.

Accordingly, the methods, apparatuses, kits, and compositions are useful for facilitating the co-processing of biomass and conventional petroleum feedstock and for facilitating processing of biomass in conventional petroleum refinery units. The methods, apparatuses, kits, and compositions can facilitate adapting existing petroleum refinery units for processing biomass (e.g., change operating parameters and feedstock), retrofitting existing petroleum refinery units for processing biomass (e.g., adding an extra riser for biomass), and constructing new, purpose-built biomass reactors (e.g., employ commercially available conventional reactor components). Thus, the methods, apparatuses, kits, and compositions can reduce the cost and increase the availability of fuel and/or specialty chemicals derived from biomass.

Preparation of the biomass for co-processing in conventional petroleum refinery units can have a synergistic effect, reducing the temperature necessary for catalytic conversion of the biomass and/or increasing the conversion efficiency of the biomass and/or facilitating processing of biomass. For example, pretreatment (e.g., biomass particle size reduction, catalyst addition, and or formation of a mechanic-chemical interaction between the biomass and catalyst, described below) can facilitate catalytic conversion under less severe conditions (e.g., lower temperatures and/or shorter time) and with a more efficiency (e.g., higher conversion of the biomass and better quality products from the conversion) than can be achieved in conventional petroleum refinery units. In various embodiments, lower temperature can be between about 450 and about 150° C. For example, the temperature can be below about 450, 425, 400, 375, 350, 325, 300, 275, 250, 225, 200, 175, or 150° C. In some embodiments, the synergistic effect can include increasing the yield of organic compounds usable as a fuel, feedstock, and/or specialty chemical, and/or reducing the yield of undesirable products such as tars and/or unconverted biomass in conventional refinery units. In certain embodiments, the synergistic effect can include converting different biomass components (e.g., cellulose, hemicellulose and/or lignin) under milder conditions (e.g., lower temperature than conventional catalytic cracking) in conventional petroleum refinery units. The synergistic effect can also include making the products of catalytic conversion more uniform, or increasing the selectivity or proportion of the production of desired products (e.g., increasing the proportion of a fraction usable as a fuel, feedstock, or specialty chemical). These results can be accomplished utilizing equipment already present in conventional petroleum refinery units.

Solid Biomass Particles

In various embodiments, biomass includes materials of photosynthetic (e.g., plant) origin having cellulose, hemicellulose, and/or lignin. Biomass includes materials produced by photosynthetic conversion of carbon dioxide and water using solar energy. In general, biomass including cellulose, hemicellulose, and/or lignin originates from land plants. Some aquatic plants include little or no lignin. However, the invention is applicable to any biomass including any amount of cellulose, hemicellulose, and/or lignin. Biomass sources include, but are not limited to, cereal grains (e.g., including corn), grasses, sugar cane, trees, and the like. Biomass sources also include by-products of agricultural or forestry activities, such as straw, chopped straw, cotton linters, corn husks, corn stalks, corn cobs, wood chips, saw dust, bagasse, sugar beet pulp, tree bark, grasses, and the like. Biomass sources also include aquatic sources such as algae and seaweed.

Biomass sources can be used without requiring chemical pre-processing (e.g., chemically altering the biomass). In various embodiments, biomass sources include (chemically) unrefined material of photosynthetic origin. Biomass sources can be subjected to a drying and/or a particle size reduction step. Such a drying and/or a particle size reduction step does not significantly change the relative composition of the biomass in terms of cellulose, hemicellulose and/or lignin and therefore such a step is not necessarily considered refining.

In various embodiments, biomass feedstock can include particles that are solid and in a finely divided form (e.g., saw dust and ground straw). Biomass feedstock can include solid materials as well as materials that might be classified as liquids, but that have a very high viscosity (e.g., small or large colony algae). Biomass particles can be prepared from biomass sources and larger particles by techniques such as milling, grinding, pulverization, and the like. Conventional paper processing/pulping methods and equipment can be used to prepare biomass particles. For example, biomass from sources such as straw and wood can be converted to particles in a size range of about 5 mm to about 5 cm using techniques such as milling or grinding.

The biomass can be subjected to a particle size reduction step, or can be collected in the form of particles (e.g., algae cells, colonies, flocculated algae, and the like). In various embodiments, the biomass particles are reduced to, or have, an average particle size of less than about 1000 microns. Alternatively, the biomass particles are reduced to, or have, an average particle size of greater than about 1000 microns. The plurality of solid biomass particles can be substantially characterized by individual sizes below about 2000, 1900, 1800, 1700, 1600, 1500, 1400, 1300, 1200, 1100, 1000, 900, 800, 700, 600, 500, 400, 300, 200, or 100 microns. In various embodiments, at least a fraction of the biomass particles have a size of about 1-2000, 1-1500, 1-1000, or 1000-2000 microns. For example, the biomass particles can have an average size of less than about 2000, 1750, 1500, 1250, 1000, 750, 500, or 250 microns. In some embodiments, at least a fraction of the biomass particles are reduced to a size below about 500, 475, 450, 425, 400, 375, 350, 325, 300, 275, 250, 225, 200, 175, 150, 125, 100, 90, 80, 70, 60, 50, 40, 30, 20, 15, 10, or 5 microns. Individual particles sizes can range from microns, to tens of microns, to tenths of centimeters, to centimeters or greater.

Solid biomass particles do not necessarily assume a spherical or spheroid shape. For example, solid biomass particles can be needle shaped and/or assume another cylinder-like or elongated shape. Accordingly, size does not necessarily correspond to a single diameter (although it could correspond to an average diameter or diameter in a singe, for example largest or smallest, dimension). In various embodiments, size can correspond to the mesh size or a screen size used in separation and/or sizing the solid biomass particles.

Agitation of Biomass Particles

In various embodiments, the method includes agitating solid biomass particles, to reduce a size characterizing at least a portion of the particles. In some embodiments, agitating is facilitated by fluid conveyance, including, without limitation, by gas flow or pneumatic conveyance. Agitating can be conducted in a vertical vessel, such as a riser or downer. An agitator can include a conveyor, a riser, or downer. A riser (up flow) or a downer (down flow) can be, for example, a hollow vertical vessel terminating in a larger diameter vessel, which houses high velocity (e.g., about 60-80 fps) cyclones that may or may not be physically connected to the riser termination point. The height can of a riser or downer can be, for example, between about 15 ft and about 60 ft and the diameter can be, for example, between about 1 ft and about 4 ft. Agitating can be facilitated by a gas (e.g., gas can convey the particles such that they are abraded or ground by other particles, catalyst, and/or inorganic particulate material). The gas can be one or more of air, steam, flue gas, carbon dioxide, carbon monoxide, hydrogen, hydrocarbons, and methane. The gas can be a gas having a reduced level of oxygen (compared to air) or can be substantially oxygen-free. In another embodiment, an agitator can be a kneader or mixer (e.g., for mechanical, as opposed to pneumatic, agitation).

In certain embodiments, agitating includes causing the solid biomass particles to be conveyed at a velocity of greater than about 1 m/s. For example, the velocity can be measured relative to a vessel in which the particles are conveyed. Agitating can include causing the solid biomass particles to move at a velocity of greater than about 10 m/s. Agitating can include causing at least a portion of the solid biomass particles to move at a velocity of greater than about 100 m/s. An agitator can be adapted to cause the solid biomass particles to move at a velocity of greater than about 1 m/s, greater than about 10 m/s, and/or greater than about 100 m/s. Other velocities include velocities of greater than about 5, 25, 50, 75, 125, 150, 175, 200, 225, and 250 m/s.

For example, the velocity is selected from the group consisting of: between about 10 and about 20 m/s; between about 20 and about 30 m/s; between about 30 and about 40 m/s; between about 40 and about 50 m/s; between about 50 and about 60 m/s; between about 60 and about 70 m/s; between about 70 and about 80 m/s; between about 80 and about 90 m/s; and between about 90 and about 100 m/s. The velocity can be about 10 m/s, about 20 m/s, about 30 m/s, about 40 m/s, about 50 m/s, about 60 m/s, about 70 m/s, about 80 m/s, about 90 m/s, or about 100 m/s. The velocity can be greater than about 10 m/s, about 20 m/s, about 30 m/s, about 40 m/s, about 50 m/s, about 60 m/s, about 70 m/s, about 80 m/s, about 90 m/s, or about 100 m/s.

In various embodiments, agitating solid biomass particles, to reduce a size characterizing at least a portion of the particles, is facilitated by agitating solid biomass particles together with a material that is harder than the biomass. For example, the material can be a catalyst or another inorganic particulate material. The amount of size reduction, and thus the size of the resulting solid biomass particles can be modulated by the duration of agitation and the velocity of agitation. Other factors such as the relative hardness of the catalyst of another inorganic particulate material, the dryness (e.g., brittleness), and the method/vessel(s) in which agitation occurs also modulate the amount of size reduction.

In embodiments using an abrading or grinding material that is a catalyst, the catalyst can become embedded in the biomass particles, which can facilitate catalytic conversion of the biomass. In such embodiments, agitating can facilitate formation of a mechano-chemical interaction between at least a portion of the catalyst and at least a portion of the solid biomass particles, which can facilitate catalytic conversion of the biomass.

Agitation can be carried out at an elevated temperature, for drying the biomass. An elevated temperature can be a temperature sufficient to dry the biomass, for example, between about 50 and about 150° C. Higher temperatures can be used, for example, where an agitating gas is oxygen-poor or substantially oxygen-free. Agitation can also be carried out at ambient temperature with dried biomass. Drying increases the hardness of the biomass particles, making the particles more susceptible to size reduction.

Agitation can be carried out by various different methods and in various different vessels. For example, in order of increasing abrasion, the agitation can be carried out in a fluid bed, a bubbling or ebullient bed, a spouting bed, or a conveyor. In one embodiment, agitation is carried out by fluid conveyance, including without limitation by gas flow or pneumatic conveyance. In one embodiment, agitation is carried out in a riser or a downer.

Agitating solid biomass particles, to reduce a size characterizing at least a portion of the particles, can result in a dispersion of particle sizes. For example, proper agitation the solid biomass particles as described above can result in individual particles sizes ranging from microns, to tens of microns, to tenths of centimeters, to centimeters or greater. In various embodiments, at least a fraction of the biomass particles are reduced to a size below about 50, 45, 40, 35, 30, 25, 20, 15, 10, or 5 microns. In one embodiment, at least a fraction of the biomass particles are reduced to a size below about 15 microns. In one embodiment, at least a fraction of the biomass particles are reduced to a size below about 10 microns.

In various embodiments, the plurality of solid biomass particles are substantially characterized by an average size between about 50 and about 70 microns and individual sizes between about 5 and about 250 microns. In other embodiments, the plurality of solid biomass particles are substantially characterized by an average size between about 10 and about 20 microns and individual sizes between about 5 and about 50 microns. In other embodiments, the plurality of solid biomass particles are substantially characterized by an average size between about 100 and about 150 microns and individual sizes between about 5 and about 500 microns.

International Publication No. WO 2007/128798 A1 by O'Connor, the disclosure of which is incorporated herein by reference in its entirety, discloses agitating solid biomass particles and catalysts. In particular, paragraphs [0027] to [0072] of WO 2007/128798 A1 are incorporated herein by reference.

International Publication No. WO 2008/009643 A2 by O'Connor, the disclosure of which is incorporated herein by reference in its entirety, discloses agitating solid biomass particles and catalysts. In particular, paragraphs [0009] to [0051] of WO 2007/128798 A1 are incorporated herein by reference.

Separation of Biomass Particles

In various embodiments, methods include separating a biomass-catalyst mixture into a fine fraction and a coarse fraction. The biomass-catalyst mixture includes the particles and a catalyst. The fine fraction includes particles of about a predetermined size. The coarse fraction includes particles of greater than about the predetermined size. Separating the mixture into a fine fraction and a coarse fraction can have several effects. For example, a fine fraction can be selected to include particles of about a predetermined size, below about a predetermined size, and/or within a predetermined size range. In some embodiments, the fine fraction can be selected to consist essentially of particles of about a predetermined size, below about a predetermined size, and/or within a predetermined size range. Furthermore, a coarse fraction can be recycled for further size reduction and/or to produce more of a fine fraction.

A predetermined size can be selected based upon one or more requirements of a subsequent reaction. For example, a predetermined size can be selected to facilitate substantial catalytic conversion of the fine fraction in a subsequent reaction. A predetermined size can be selected to facilitate contact, impregnation, and/or interaction of the catalyst and the biomass. In some embodiments, a predetermined size can be about 2000, 1900, 1800, 1700, 1600, 1500, 1400, 1300, 1200, 1100, 1000, 900, 800, 700, 600, 500, 450, 400, 350, 300, 250, 200, 150, 100, 50, 45, 40, 35, 30, 25, 20, 15, 10, or 5 microns, or any individual value therebetween. In one embodiment, a predetermined size is about 15 microns. In one embodiment, a predetermined size is about 10 microns. A predetermined size can be between about 1 and 2000 microns or between about 5 and about 1000 microns.

Separating can be facilitated by a cyclonic action. A separator can include a single cyclone. Alternatively, a separator can include a plurality of cyclones arranged, for example, in parallel, series, as a third stage separator, or as a fourth stage separator. U.S. Pat. No. 6,971,594 to Polifka, the disclosure of which is incorporated herein by reference in its entirety, discloses cyclonic action and cyclone separators that can be adapted and employed with the invention. In particular, FIG. 2, the text corresponding to FIG. 2, and the text corresponding to column 4, line 55 to column 11, line 55 of U.S. Pat. No. 6,971,594 is incorporated herein by reference.

Separating can be achieved by other known methods. For example, separating can be achieved by screening, settling, clarification, and the like.

Catalysts and Inorganic Particulate Materials

A catalyst can be any material that facilitates the conversion of organic components of the biomass into fuels, specialty chemicals, or precursors thereof. In various embodiments, the catalyst includes a solid particulate catalyst and the biomass-catalyst mixture includes at least a portion of the catalyst mechano-chemically interacting with at least a portion of the solid biomass particles. In some embodiments, the catalyst includes a catalyst capable of being at least partly dissolved or suspended in a liquid and the biomass-catalyst mixture includes at least a portion of the catalyst impregnating at least a portion of the solid biomass particles.

In various embodiments, a catalyst is a particulate inorganic oxide. The particulate inorganic oxide can be a refractory oxide, clay, hydrotalcite, crystalline aluminosilicate, layered hydroxyl salt, or a mixture thereof. Suitable refractory inorganic oxides include alumina, silica, silica-alumina, titania, zirconia, and the like. In one embodiment, the refractory inorganic oxides have a high specific surface (e.g., a specific surface area as determined by the Brunauer Emmett Teller ("BET") method of at least 50 m$^2$/g). Suitable clay materials include cationic and anionic clays, for example, smectite, bentonite, sepiolite, atapulgite, hydrotalcite, and the like. Suitable metal hydroxides and metal oxides include bauxite, gibbsite and their transition forms. Other suitable (and inexpensive) catalysts include lime, brine, and/or bauxite dissolved in a base (e.g., NaOH), or a natural clay dissolved in an acid or a base, or fine powder cement (e.g., from a kiln). Suitable hydrotalcites include hydrotalcite, mixed metal oxides and hydroxides having a hydrotalcite-like structure, and metal hydroxyl salts.

In some embodiments, a catalyst can be a catalytic metal. The catalytic metal can be used alone or together with another catalyst. A catalytic metal can be used in a metallic, oxide, hydroxide, hydroxyl oxide, or salt form, or as a metallo-organic compound, or as a material including a rare earth metal (e.g., bastnesite). In certain embodiments, the catalytic metal is a transition metal. The catalytic metal can be a non-noble transition metal. For example, the catalytic metal can be iron, zinc, copper, nickel, and manganese. In one embodiment, the catalytic metal is iron.

A catalytic metal can be contacted with the biomass by various methods. In one embodiment, the catalyst is added in its metallic form, in the form of small particles. Alternatively, the catalyst can be added in the form of an oxide, hydroxide, or a salt. In another embodiment, a water-soluble salt of the metal is mixed with the biomass and the inert particulate inorganic material in the form of an aqueous slurry. The biomass and the aqueous solution of the metal salt can be mixed before adding the inert particulate inorganic material to facilitate the metal impregnating the biomass. The biomass can also be mixed with the inert particulate inorganic material prior to adding the aqueous solution of the metal salt. In still another embodiment, an aqueous solution of a metal salt is mixed with the inert inorganic material, the material is dried prior to mixing it with the particulate biomass, and the inert inorganic material is thus converted to a heterogeneous catalyst.

The biomass-catalyst mixture can include an inorganic particulate material. An inorganic particulate material can be inert or catalytic. An inorganic material can be present in a crystalline or quasi-crystalline form. Exemplary inert materials include inorganic salts such as the salts of alkali and alkaline earth metals. Although these materials do not necessarily contribute to a subsequent chemical conversion of the polymeric material, it is believed that the formation of discrete particles of these materials within the biomass can work as a wedge to mechanically breaking up or opening the structure of the biomass, which can increase the biomass surface accessible to microorganisms and/or catalysts. In one embodiment, the breaking up or opening is facilitated by crystalline or quasi-crystalline particles.

Inorganic particulate material can have catalytic properties. For example, a catalytic inorganic particulate material can be a metal oxide or hydroxide such as an alumina, silica, silica aluminas clay, zeolite, ionic clay, cationic layered material, layered double hydroxide, smectite, saponite, sepiolite, metal hydroxyl salt, and the like. Carbonates and hydroxides of alkali metals, and the oxides, hydroxides and carbonates of alkali earth metals can also have catalytic properties. Inorganic particulate material can include mixtures of inorganic materials. Inorganic particulate material can include a spent (resid) fluid catalytic cracking catalyst containing (thermally treated) layered material. Employing spent catalyst can involve reusing waste material. The spent catalyst can be ground of pulverized into smaller particles to increasing dispersibility. Inorganic particulate material can also include sandblasting grit. Employing sandblasting grit can involve reusing waste material, which can include particles of iron, and lesser quantities of other suitable metals such as nickel, zinc, chromium, manganese, and the like (e.g., grit from steel sandblasting).

Contacting the catalyst, and optionally the inorganic particulate material, with the biomass, can be achieved by various methods. One method includes heating and fluidizing a mixture of the particulate biomass material and the inert inorganic material, and adding the catalyst to the mixture as fine solid particles. Another method includes dispersing the catalytic material in a solvent (e.g., water), and adding the solvent to the mixture of particulate biomass material and the inert inorganic material.

European Patent Application No. EP 1 852 466 A1 by O'Connor, the disclosure of which is incorporated herein by reference in its entirety, discloses catalysts and contacting catalysts and biomass. In particular, paragraphs [0011] to [0043] of EP 1 852 466 A1 are incorporated herein by reference.

International Publication No. WO 2007/128799 A1 by O'Connor, the disclosure of which is incorporated herein by reference in its entirety, discloses catalysts and contacting catalysts and biomass. In particular, paragraphs [0015] to [0054] of WO 2007/128799 A1 are incorporated herein by reference.

Pre-Treating Biomass

In various embodiments, biomass feedstock can be chemically and/or physically pre-treated. Examples of pre-treatment steps in which recycled aqueous phase can be used include demineralization, heat treatment, and steam explosion.

Demineralization can include removing at least a fraction of a naturally occurring mineral from biomass (e.g., prior to a pyrolysis or catalytic cracking reaction). Demineralization can improve control over the reaction of the biomass. Many of the minerals naturally present in the biomass material can be catalytically active (e.g., potassium, iron). Although these materials can catalyze reactions, they can also increase coke yield, which is generally undesirable. Even when catalytic activity is desired, it can be preferable to first demineralize the biomass material so as to control the composition of their catalyst system.

In various embodiments, a pretreatment can reduce an ash content of biomass, or a hazardous disposal characteristic of an ash that may be subsequently produced. Removal of minerals (e.g., ash precursors) from the biomass can reduce the ash content. Removal of metals (e.g., ash precursors), particularly heavy metals, can also reduce ash content and prevent metal contamination of waste products, thereby facilitating disposal of waste by providing an uncontaminated waste product and reducing the cost of disposing of the waste product.

A pretreatment for reducing ash content can include swelling the biomass with a solvent and then removing solvent from the swollen biomass material by applying mechanical action to the biomass material. Ash precursors, such as dissolved minerals and/or metals, will thus be removed with the solvent. The solvent can be aqueous. The solvent can include an acid or base (e.g., inorganic acid or base). The mechanical action can occur in an agitator and/or a kneader. The mechanical action can be exerted by equipment such as a high shear mixer, kneader, colloid mill, planetary mixer, mix-miller, or ball mill. A pretreatment for reducing ash content can include washing or slurring with an aqueous phase having pH above or below neutral, ion exchange (e.g., with ammonium solutions that would exchange a hydrogen ion with a metal ion), and steam stripping are possible methods. In addition to removing minerals from the biomass, the swelling and dewatering steps can make the biomass material more susceptible to a subsequent reaction.

Although essentially any aqueous solvent can be used for demineralization, the aqueous phase of a liquid pyrolysis product can be particularly effective. The effectiveness is believed to be due to the presence of organic acids (e.g., carboxylic acid, acetic acid) in the aqueous phase. Without wishing to be bound by any theory, the acidity of the aqueous phase can facilitate the mobilization of minerals in the biomass. For example, the chelating effects of carboxylic acids can contribute to the solubilization and removal of mineral cations.

De-mineralizing biomass (e.g., algae) can mitigate at least one of char and ash formation upon conversion (e.g., pyrolysis, catalytic cracking) of the biomass into a fuel or specialty chemical by removing the mineral precursors of the char and/or ash from the biomass. De-mineralizing biomass (e.g., algae) can also produce a fertilizer by separating a fraction of the biomass suitable for use as a fertilizer or specialty chemical. The fraction of the biomass can include a mineral solution as a raw extract (e.g., essentially the solvent removed during de-mineralization) or as a fraction of the raw extract (e.g., water, mineral, or other component at least partially removed).

Pretreatment can reduce ash content to less than about 10 wt %, 9 wt %, 8 wt %, 7 wt %, 6 wt %, 5 wt %, 4 wt %, 3 wt %, 2 wt %, or 1 wt %, based on dry weight of the biomass material. The pretreatment can reduce metal (e.g., Fe) content to less than about 3,000, 2,500, 2,000, 1,500, 1,000, or 500 mg/kg, based on dry weight of the biomass.

Solvent explosion can include contacting the biomass with a pressurized solvent at a temperature above its natural boiling point (e.g., at atmospheric pressure). The pressurized solvent is in a liquid phase and swells the biomass. Then, the solvent is de-pressurized, causing rapid evaporation (e.g., boiling) of the solvent. This rapid evaporation can be referred to as solvent explosion. The solvent explosion can physically rupture the biomass material, thereby making it more accessible in a subsequent reaction.

Examples of solvents that can be used in solvent explosion include ammonia, carbon dioxide, water, and the like. If water is used as the solvent, the process can be referred to as steam explosion. It is understood that the term steam explosion can be considered a misnomer, and that the term water explosion can be more accurate. Nevertheless, the term steam explosion is used herein because it is an accepted term of art. The aqueous phase of the liquid pyrolysis product can be used in a steam explosion.

When steam explosion is combined with demineralization, the steam explosion can be carried out before or after the demineralization. For example, it can be advantageous to conduct the demineralization after the steam explosion because the steam explosion pretreatment can make the minerals more accessible, thereby making the demineralization more effective.

Heat treatment (e.g., torrefaction) can include heating the biomass to a temperature of about 100-300° C. in an oxygen-poor or oxygen-free atmosphere. The term oxygen-poor can refer to an atmosphere containing less oxygen than ambient air. The heat treatment can carried out in the presence of sufficient solvent (e.g., water) to swell the biomass material. The heat treatment can be carried out in a closed vessel to mitigate evaporation of the solvent. In some examples, the vapor (e.g., steam) formed under these conditions can displace oxygen present in the vessel and produce an oxygen-poor atmosphere. In one example, the aqueous phase of a liquid pyrolysis product can be the solvent in such a heat treatment.

Heat treatment can be carried out at a temperature low enough to mitigate carbon loss due to the formation of gaseous conversion products (e.g., CO, CO2). A heat treatment can use, for example, a temperature of about 100-200° C. For example, a temperature can be about 100-140° C. A heat treatment can have a duration, for example, of about 2 min to 2 hours. For example, a duration can be about 20-60 min. In various examples, pressure can be released at the end of a heat treatment by opening the heat treatment vessel, which can allow the heat treatment to be combined with a steam explosion pretreatment step.

Even when the heat treatment essentially does not produce any gaseous conversion products, it can still result in a modification of the biomass. For example, the heat treatment can make the biomass more brittle and more hydrophobic. Both effects can be desirable from the perspective of a subsequent reaction. For example, increased brittleness can facilitate girding the biomass to a small particle size, to increase reactivity in a pyrolysis reaction, and increased hydrophobicity can facilitate drying the biomass.

In one embodiment, a method of producing a biomass feedstock from algae can include torrefying the algae at a temperature below about 300° C., to produce a plurality of solid biomass particles having an increased brittleness and/or susceptibility to catalytic conversion.

A heat pretreatment step can be combined with one or more additions pretreatment steps (e.g., demineralization, steam explosion). Because of the increased hydrophobicity of heat treated biomass, it can be preferable to conduct any demineralization and/or steam explosion steps prior to the heat treatment; with the exception that steam explosion can be combined with heat treatment as described above.

Kneaders

A kneader can be used to knead the solid biomass particles and the catalyst, to make at least a portion of the solid biomass particles accessible to at least a portion of the catalyst. The kneader can be an extruder, miller, mixer, or grinder. The kneader can operate at greater than ambient temperature, for example, to facilitate removal or water and/or other solvent. For example, the kneader can be heated and/or heated gas (e.g., steam) can be provided to heat the biomass and catalyst.

In various embodiments, the kneader employs a solvent. The solvent can be water, an alcohol (e.g., ethanol or glycerol), a bio-oil or another product from the conversion of the biomass, a liquid acid, an aqueous acid or base, liquid $CO_2$, and the like. In one embodiment, the solvent is water (e.g., added water and/or water inherent in the biomass), which can be selected for its availability, low cost, and/or ease of handling. In another embodiment, the solvent is a liquid produced during the subsequent conversion of the biomass, which can be selected for its availability. A solvent can be selected to improve penetration of a catalyst into biomass. A solvent can also improve penetration of a catalyst into biomass because a dry biomass can be more difficult to penetrate. A solvent can also be selected to remove ash precursors. Solvents can be removed (e.g., by drying) prior to subsequent processing and/or conversion. A kneader can remove at least a portion of a solvent absorbed in a biomass (e.g., by mechanical action and draining). Embodiments employing a kneader and a solvent can reduce the ash and/or mineral and/or metal content of the biomass.

In various embodiments, the biomass can be kneaded with one or more solid catalyst and/or inorganic particulate material. In some embodiments, the biomass can be kneaded with a dissolved and/or suspended catalyst. The dissolved and/or suspended catalyst can be used together with one or more solid catalyst and/or inorganic particulate material. Kneading can be continued and/or repeated to produce a biomass-catalyst mixture having the desired properties (e.g., particle size and/or degree of sensitization).

International Publication No. WO 2007/128800 A1 by O'Connor, the disclosure of which is incorporated herein by reference in its entirety, discloses catalysts and sensitizing biomass, as well as sensitizing by kneading. In particular, paragraphs [0025] to [0074] with respect to catalysts and sensitizing biomass, as well paragraphs [0076] to [0086] with respect to sensitizing by kneading, of WO 2007/128800 A1 are incorporated herein by reference.

Disintegrators

The disintegrator processes plant matter at a location in close proximity to an agricultural site used to produce such plant matter, to produce the solid biomass particles. In operation, a disintegrator can be used to modify the consistency of, e.g., biomass feedstock, and/or to reduce its average particle size. The disintegrator can include at least one of a mill, fragmenter, fractionator, granulator, pulverizer, chipper, chopper, grinder, shredder, mincer, and a crusher. Apparatuses including a disintegrator can process plant matter at a location in close proximity to an agricultural site used to produce such plant matter, to produce the solid biomass particles. U.S. Pat. No. 6,485,774 to Bransby, the disclosure of which is incorporated herein by reference in its entirety, discloses a method of preparing and handling chopped plant materials. In particular, the text corresponding to column 1, line 45 to column 4, line 65 of U.S. Pat. No. 6,485,774 is incorporated herein by reference.

EXAMPLES

FIGS. 1-4 show exemplary systems for preparing and processing biomass with catalyst. The technology also includes methods corresponding to the operation of the systems (i.e., apparatuses) corresponding to FIGS. 1-4. The technology also includes kits for setting up the apparatuses and carrying out the methods corresponding to FIGS. 1-4. The technology also includes products and intermediates, and fractions thereof, corresponding to FIGS. 1-4. It should be understood that one skilled in the art could modify or adapt the exemplary systems, or any other system described herein, to convert biomass into fuels or specialty chemicals. For example, catalyst, reaction vessel(s), pretreatment, and reaction conditions can be selected based upon the type of biomass and the desired product. In some embodiments, the processing can occur in a single vessel. In other embodiments, two or more vessels can be used.

In various embodiments, the intermediates include hydrocarbons from which oxygen is stripped (e.g., as CO, $CO_2$, $H_2O$) to produce traditional hydrocarbon products such as light gases, naphtha, heating oils, and the like. In general, processing proceeds by cracking and deoxygenating (as necessary) polymeric compounds in the biomass into hydrocarbon products. In various embodiments, intermediates can be stripped quickly from the catalysts and unconverted biomass to limit secondary (e.g., undesired) reactions.

Figure 1:
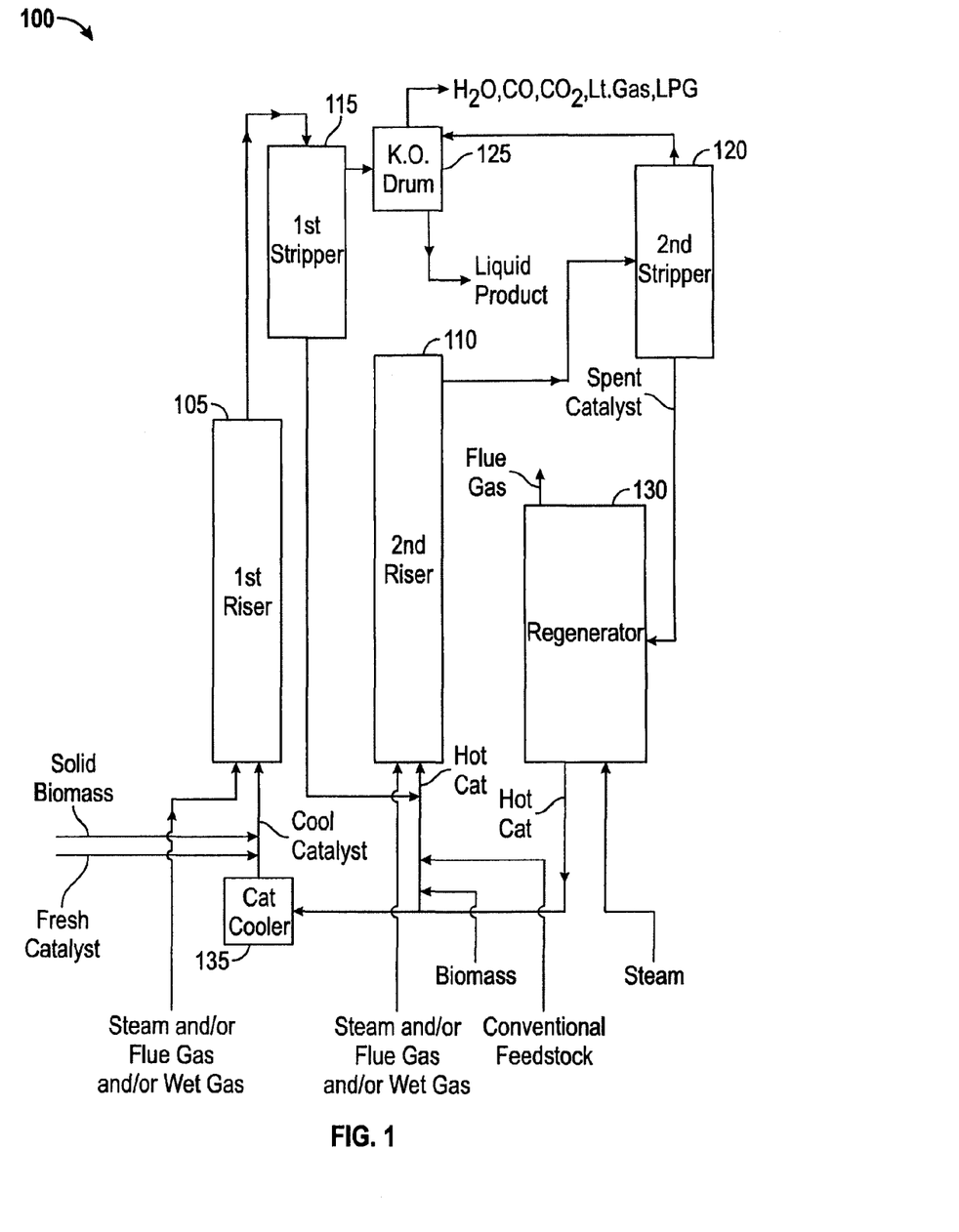
FIG. 1 shows a catalytic cracking system including two risers and a catalyst cooler.

FIG. 1 shows a catalytic cracking system 100 adapted for processing solid biomass particles. The system 100 includes a first riser 105, second riser 110, first stripper 115, second stripper 120, first knock out drum 125, regenerator 130, and catalyst cooler 135.

In various embodiments, one or more of the first riser 105, second riser 110, first stripper 115, a second stripper 120, first knock out drum 125, and regenerator 130 can be part of a preexisting catalytic cracking system. The preexisting catalytic cracking system can be retrofitted for processing of solid biomass particles. For example, retrofitting can include adding the catalyst cooler 135. Retrofitting can include modulating the operating parameters of one or more components of the preexisting catalytic cracking system.

The first riser 105 can receive solid biomass particles and a catalyst (e.g., cool fresh catalyst, as described herein, cool fresh FCC catalyst, and/or cool recycled catalyst). In various embodiments, cool catalyst is about 105° C. The first riser 105 can also receive a gas (e.g., steam, flue gas, and/or wet gas), which can heat the first riser 105. For example, the first riser 105 can be operated at a temperature below about 375° C. The gas can agitate the solid biomass particles and the catalyst, providing a velocity to at least a portion of the solid biomass particles sufficient to reduce their sizes (e.g., via abrasion or grinding action). For example, the resulting solid biomass particles can be substantially characterized by an average size between about 50 and about 70 microns and individual sizes between about 5 and about 250 microns. De-watering of the biomass can also occur in the first riser 105 (e.g., by evaporation, mechanical action, or both). De-oxygenation of the biomass can occur in the first riser 105. In various embodiments, the first riser 105 can be operated at a temperature (e.g., about 150 to about 400° C.) lower than a conventional (e.g., petrochemical) reactor. The lower temperature can facilitate conversion and product selectivity from solid biomass to liquefied biomass feedstock.

In various embodiments, liquefying at least a portion of a solid biomass feedstock includes operating the first reaction vessel at a temperature selected from the group consisting of about 450° C., about 425° C., about 400° C., about 375° C., about 350° C., about 325° C., about 300° C., about 275° C., about 250° C., about 225° C., about 200° C., about 175° C., about 150° C., between about 450 and 425° C., between about 425 and 400° C., between about 400 and 375° C., between about 375 and 350° C., between about 350 and 325° C., between about 325 and 300° C., between about 300 and 275° C., between about 275 and 250° C., between about 250 and 225° C., between about 225 and 200° C., between about 200 and 175° C., and between about 175 and 150° C.

The first stripper 115 can receive the biomass and the catalyst from the first riser 105, can fluidize the catalyst, and can strip hydrocarbons from the surface of the catalyst. Stripping can be facilitated by steam (e.g., steam can remove hydrocarbons in the interstitial spaces on or between catalyst particles).

The first knock out drum 125 can receive a gas fraction from the overhead of the first stripper 115 and/or the second stripper 120. The knock out drum 125 can cool and liquefy at least a portion of the gas fraction (cooling provided, but not shown), which allows the aqueous and hydrophobic phases to separate. The aqueous phase (e.g., water) can be removed and the hydrophobic phase can be separated as a liquid product (e.g., fuels, specialty chemicals, other intermediates) using a separator (not shown). Another portion of the gas fraction (e.g., from the knock out drum overheads) can include desirable products that are not liquefied (e.g., light gas, liquefied petroleum gas), but which can be separated and used, as well as oxygenated gases (e.g., $H_2O$, $CO$, $CO_2$). In some embodiments the oxygenated gases can also be used (e.g., using $CO_2$ to facilitate algae growth, which has the additional benefit of reducing greenhouse gas/carbon emissions).

The second riser 110 can receive a fluidized fraction (e.g., liquefied biomass feedstock) from the first stripper 115. The second riser 110 can also receive a conventional (e.g., petrochemical) feedstock. Thus, the second riser 110 can co-process the liquefied biomass feedstock and the conventional petroleum feedstock. The second riser 110 can receive, and be heated by, hot catalyst from the regenerator 130. The second riser 110 can also receive, and be heated by, a hot gas (e.g., steam, flue gas, wet gas). In some embodiments the second riser 110 operates at a temperature above about 400° C. In various embodiments, the second riser 110 can be operated essentially as a conventional reactor (i.e., a reactor designed for processing conventional petroleum feedstock, not liquefied biomass feedstock).

Where an apparatus can co-process a biomass feedstock and a conventional petroleum feedstock, the catalytic cracking system can include a first feed system and a second feed system (not shown). The first feed system can provide the biomass feedstock (e.g., a biomass-catalyst mixture, a plurality of solid biomass particles, at least a portion of a liquefied biomass feedstock) to a refinery unit. The second feed system can provide the conventional petroleum feedstock to a refinery unit. The first feed system can be adapted to provide a suspension of a solid biomass feedstock in a liquefied biomass feedstock or a petroleum feedstock (e.g., torrefied biomass particles suspended in a biocrude or crude oil).

In various embodiments, the liquefied biomass feedstock is between about 1 and about 100 wt % of the biomass-conventional petroleum feedstock used in co-processing. The liquefied biomass feedstock can be between about 5 and about 50 wt % of the biomass-conventional petroleum feedstock used in co-processing. The liquefied biomass feedstock can be between about 10 and about 20 wt % of the biomass-conventional petroleum feedstock used in co-processing.

The second stripper 120 can receive the product of the second riser 110, strip hydrocarbons from the surface of the catalyst, provide a gas and/or liquid fraction to the first knock out drum 125, and provide any spent catalyst to the regenerator 130. As with the first stripper, stripping can be facilitated by steam. The operating parameters of the first stripper 115 and the second stripper 120 can be the same or independently selected and controlled. In various embodiments the strippers, 105 and 120 can be operated within the operating parameters of a conventional catalytic cracking system (about 450 to about 550° C.). Stripping can be accomplished by introducing high temperature steam at the bottom of the stripper, which can increase the stripper temperature to about 300 to about 350° C. Such temperatures can result in deoxygenation. In general, the stripper temperature can be at about, or below about, the temperature of the second riser 110.

The regenerator 130 can receive spent catalyst from the second stripper 120, and can be used to regenerate the catalyst for reuse. In this arrangement, the second stripper 120 increases product yield, decreases coke, decreases flue gas production, and decreases the necessary regenerator temperature because it decreases the amount of hydrocarbons that enter, and are thus burned in, the regenerator 130. The regenerator 130 can be heated by steam (e.g., dispersion steam) to a temperature below about 800° C. The regenerator 130 produces flue gas, which can be used in other portions of the system (e.g., the risers 105 and 110).

The catalyst cooler 135 can receive hot regenerated catalyst from the regenerator 130, and cool the catalyst. The cooled catalyst can be reintroduced into the system 100 in the first riser 105. In general, the catalyst cooler 135 can be operated by known methods (e.g., as in a conventional FCC system). However, the temperature to which the catalyst cooler cools the catalyst can be selected based upon the operating parameters of the reactor to which the cooled catalyst will be delivered. For example, if the cooled catalyst will be delivered to a deoxygenating reactor (e.g., two riser systems such as those shown in FIGS. 1 and 3), the cooled catalyst should be compatible with a reactor operating at less than about 350° C. For example, if the cooled catalyst will be delivered to a dewatering and particle size reducing reactor (e.g., three riser systems such as those shown in FIG. 4), the cooled catalyst should be compatible with a reactor operating at less than about 200° C.

Figure 2:
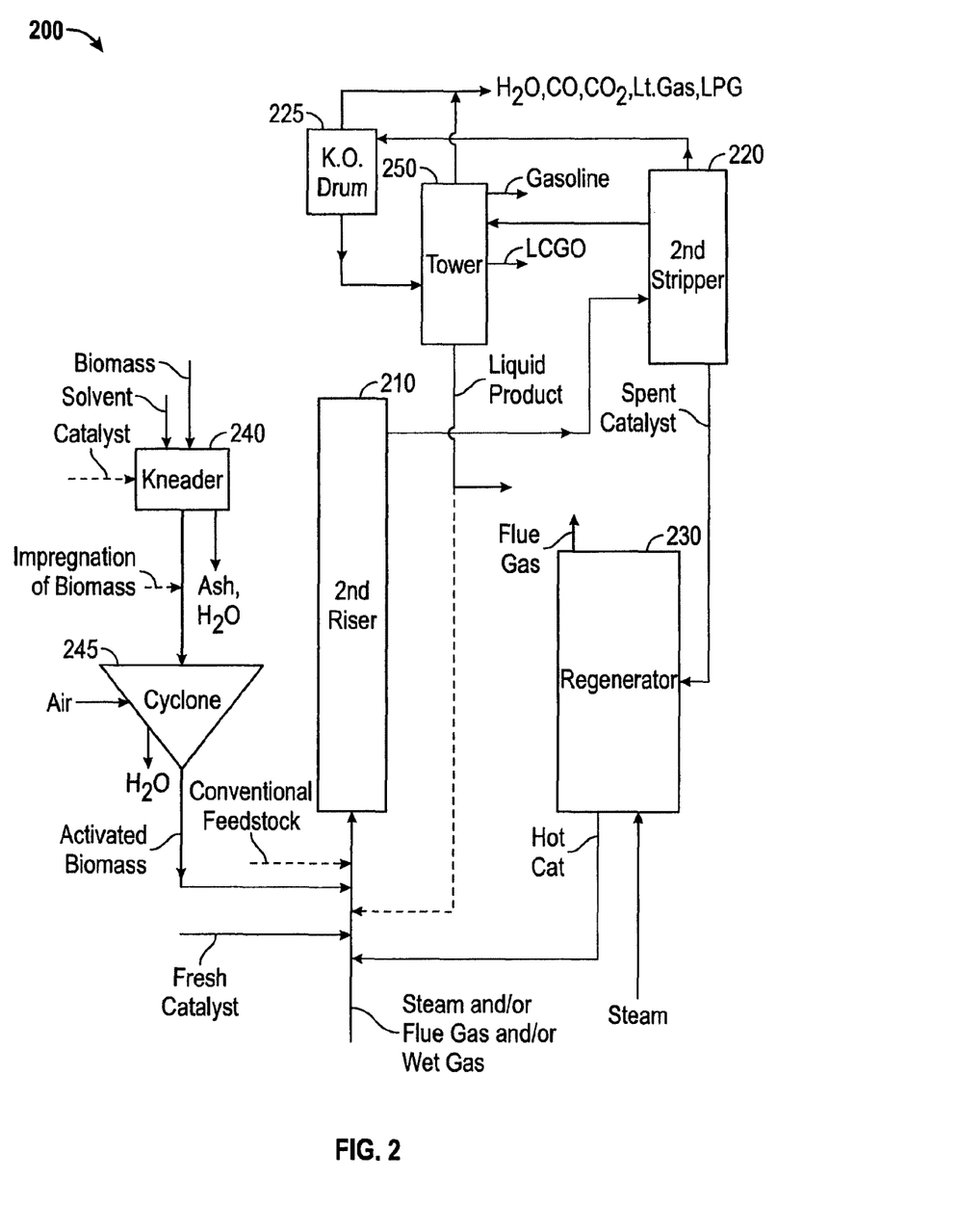
FIG. 2 shows a catalytic cracking system including one riser, a kneader, and a cyclone.

FIG. 2 shows a catalytic cracking system 200 adapted for processing solid biomass particles. The system 200 includes a second riser 210, second stripper 220, first knock out drum 225, regenerator 230, kneader 240, cyclone pretreater 245, and tower 250.

In various embodiments, one or more of the second riser 210, second stripper 220, first knock out drum 225, regenerator 230 can be part of a preexisting catalytic cracking system. The preexisting catalytic cracking system can be retrofit for processing solid biomass particles. Retrofitting can include adding the kneader 240, cyclone pretreater 245, and tower 250. Retrofitting can include modulating the operating parameters of one or more components of the preexisting catalytic cracking system.

The kneader 240 can receive and knead the biomass thereby, e.g., increasing its available exposed surface area and commencing the separation of its constituents. The kneader can also receive a solvent (e.g., $H_2O$, ethanol), which can facilitate removal of ash (e.g., minerals, metals) from the biomass, as described above. At least a portion of the solvent, and/or other liquid intrinsic to unprocessed biomass, can also be removed from the biomass in the kneader 240. The kneader 240, can also receive a catalyst and knead the solid biomass particles and the catalyst, to make at least a portion of the solid biomass particles accessible to at least a portion of the catalyst (e.g., produce biomass "activated" for catalytic conversion). In some embodiments, the kneader can effect a size reduction in solid biomass particles. Although the kneader is shown before the cyclone pretreater 245, it is also possible knead or re-knead solid biomass particles after cyclonic treatment.

The cyclone pretreater 245 can receive the kneaded biomass from the kneader 240, and agitate the solid biomass particles. Agitating the solid biomass particles can reduce the sizes of the solid biomass particles (e.g., the cyclone pretreater 245 can receive a gas that conveys the solid biomass particles). In various embodiments, the solid particles are reduced to a size sufficient to be dissolved or suspended in a liquid feedstock (e.g., biomass, conventional petroleum, or mixtures thereof) and introduced directly into the second riser 210. In some embodiments, the solid biomass particles are reduced to a size sufficient that the solid biomass particles flow like a liquid and can be gravity-fed into a subsequent reaction vessel. The cyclone pretreater 245 can dry (e.g., de-water and/or remove other solvent) the solid biomass particles. Drying can be facilitated by heating the solid biomass particles (e.g., agitating with a hot gas). Drying can also be facilitated by mechanical action. The water and/or other solvent can be vented (e.g., in a gas phase) and/or drained (e.g., in a liquid phase).

The second riser 210 can receive activated biomass from the cyclone pretreater 245. In various embodiments, the individual activated biomass particles have sizes small enough that the activated biomass flows and can be gravity-fed into the second riser 210. The second riser 210 can also receive a conventional petroleum feedstock. Thus, the second riser 210 can co-process the activated biomass feedstock and the conventional petroleum feedstock. Furthermore, the second riser 210 can receive, and further process, a fraction recycled from the tower 250.

The second riser 210 can receive, and be heated by, hot catalyst from the regenerator 230. The second riser 210 can receive, and be cooled by, cold fresh FCC catalyst. The second riser 210 can also receive, and be heated by, a hot gas. For example, the second riser 110 can function at a temperature above about 400° C. In various embodiments, the second riser 110 can be operated essentially as a conventional reactor. The second riser 210 can include any of the features of the second riser 110.

The second stripper 220 can receive the product of the second riser 210, strip hydrocarbons from the surface of the catalyst, provide a gas and/or a liquid fraction to the first knock out drum 225, provide any spent catalyst to the regenerator 230, and provide a gas and/or liquid fraction to the tower 250. The second stripper 220 can include any of the features of the second stripper 120.

The first knock out drum 225 can receive a gas and/or a liquid fraction from the second stripper 220. The first knock out drum 225 can separate and remove an aqueous portion of the fraction. The first knock out drum 225 can separate and remove a hydrophobic portion of the fraction, which can be a product (e.g., fuels, specialty chemicals) or an intermediate to be subjected to further processing (e.g., provided to the tower 250). The first knock out drum 225 can also separate a gas portion, which can include product (e.g., light gas, LPG) and/or other gases (e.g., $H_2O$, CO, $CO_2$). The first knock out drum 225 can include any of the features of the first knock out drum 125.

The regenerator 230 can receive spent catalyst from the second stripper 220, and can regenerate the catalyst. Regenerated catalyst can be reintroduced into the process stream and can heat the second riser 210. The regenerator 230 can include any of the features of the regenerator 130.

The tower 250, e.g., a distillation tower, can receive dissolved gas and/or liquid fractions from the second stripper 220 and the first knock out drum 225. The tower 250 can separate these fractions. For example, the tower can be used to separate gasoline, light cycle gas oil (LCGO), other liquid products (e.g., fuels, specialty chemicals), gas products (e.g., light gas, LPG), other gases (e.g., $H_2O$, CO, $CO_2$), and hydrocarbon compounds requiring further processing (e.g., intermediates recycled into the second riser 210). Side streams can be withdrawn at one or more locations along the length of the tower 250 for recycling and/or further separation. Thus, the tower 250 can functions as a main column of a catalytic unit. Similarly, gaseous products from the first knock out drum 225 can be combined with the overhead light gas stream from the tower 250 and be sent to a conventional light gas separation section. In some applications, $CO_2$ can be recovered (and possibly added to a $CO_2$ rich stream from the regenerator flue gas) and recycled to facilitate growth of biomass feedstock (e.g., algae pond or greenhouse).

Figure 3:
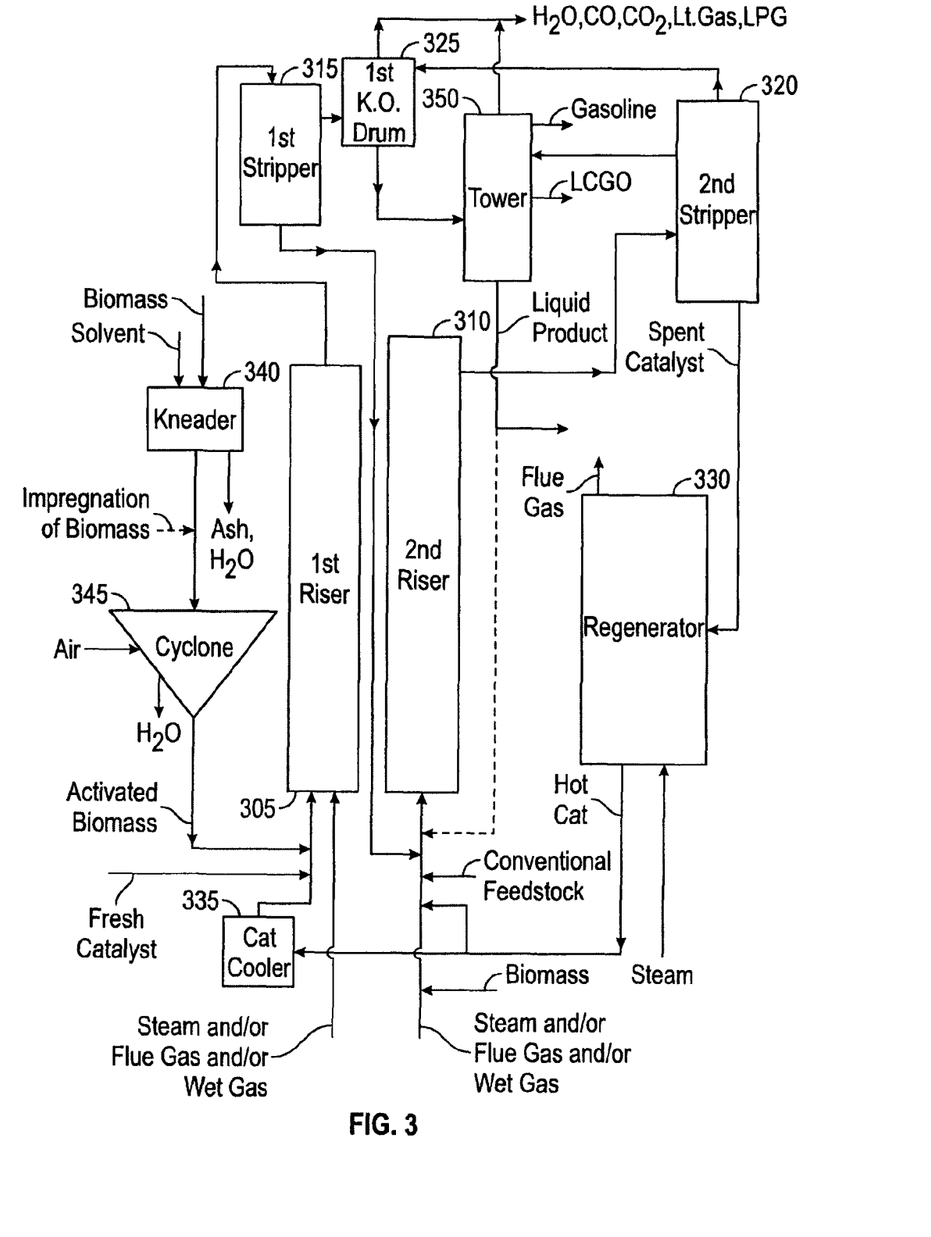
FIG. 3 shows a catalytic cracking system including two risers, a kneader, a cyclone, and a catalyst cooler.

FIG. 3 shows a catalytic cracking system 300 adapted for processing solid biomass particles. The system 300 includes a first riser 305, second riser 310, first stripper 315, second stripper 320, first knock out drum 325, regenerator 330, catalyst cooler 335, kneader 340, cyclone pretreater 345, and tower 350.

In various embodiments, component of a preexisting catalytic cracking system can be used to treat biomass. For example, one or more of the first riser 305, second riser 310, first stripper 315, second stripper 320, first knock out drum 325, and regenerator 330 can be part of a preexisting catalytic cracking system. A separation section of a preexisting catalytic cracking system can also be used, along with existing pieces of equipment such as air blowers, gas compressors, pumps, and the like. The preexisting catalytic cracking system can be retrofit for processing solid biomass particles. Retrofitting can include adding the catalyst cooler 335, kneader 340, cyclone pretreater 345, and tower 350. Retrofitting can include modulating the operating parameters of one or more components of the preexisting catalytic cracking system.

The system 300 shown in FIG. 3 is similar to the system 200 shown in FIG. 2, except that the system 300 includes an additional first riser 305, first stripper 315, and catalyst cooler 335. These additional components can facilitate deoxygenation of the biomass and can increase product yield, product selectivity, and/or operating efficiency of the system 300.

The kneader 340 and the cyclone pretreater 345 function substantially as, and can include any of the features of, the kneader 240 and the cyclone pretreater 245, respectively.

The first riser 305 can receive solid biomass particles and catalyst from the cyclone pretreater 245. The first riser 305 can receive cool fresh catalyst and/or cool recycled catalyst. The first riser 305 can also receive a gas, which can heat the first riser 305, and which can agitate the solid biomass particles and the catalyst, providing a velocity to at least a portion of the solid biomass particles sufficient to reduce their sizes. However, in various embodiments, particle size reduction in the system 300 occurs predominantly in the cyclone pretreater 345 or kneader 340. De-oxygenation of the biomass can occur in the first riser 305. The first riser 305 can include any of the features of the first riser 105. In some embodiments one riser can be used for particle size reduction and dewatering (e.g., in three riser systems such as those shown in FIG. 4) while in some embodiments a first riser, such as first risers 105 and 305, can be used for deoxygenation (e.g., in two riser systems such as those shown in FIGS. 1 and 3).

The first stripper 315 can receive the biomass and the catalyst from the first riser 305, can fluidize the catalyst, and can strip hydrocarbons from the surface of the catalyst. The first stripper 315 can include any of the features of the first strippers 115 and 215.

The second riser 310, second stripper 320, first knock out drum 325, regenerator 330, and tower 350 function substantially as, and can include any of the features of, second risers 110 and 210, second strippers 120 and 220, first knock out drums 125 and 225, regenerators 130 and 230, and tower 250, respectively.

The catalyst cooler 335 can receive hot regenerated catalyst from the regenerator 330, and cool the regenerated catalyst. The cooled catalyst can be reintroduced into the system 300 in the first riser 305. The catalyst cooler 335 can include any of the features of the catalyst cooler 135.

Figure 4:
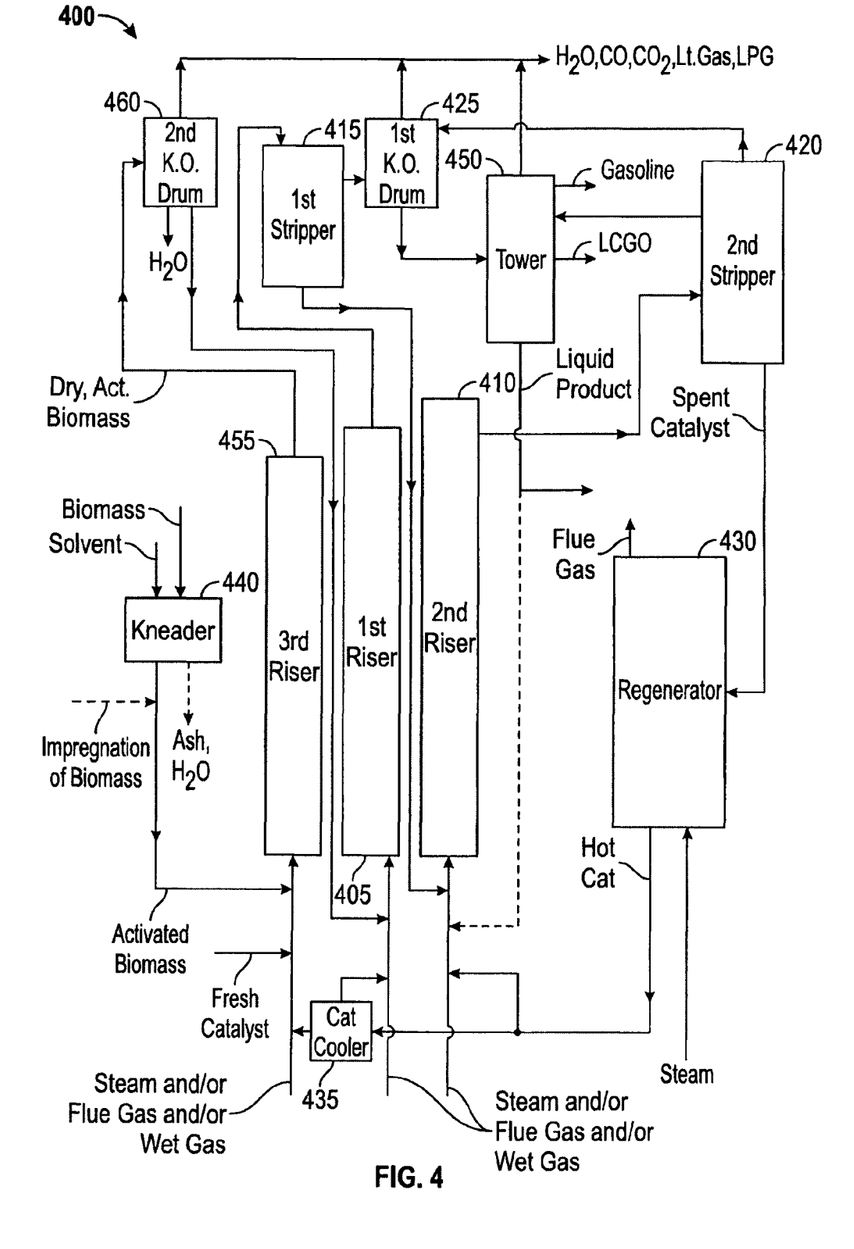
FIG. 4 shows a catalytic cracking system including three risers, a kneader, and a catalyst cooler.

FIG. 4 shows a catalytic cracking system 400 adapted for processing solid biomass particles. The system 400 includes a first riser 405, second riser 410, first stripper 415, second stripper 420, first knock out drum 425, regenerator 430, catalyst cooler 435, kneader 440, tower 450, third riser 455, and second knock out drum 460.

In various embodiments, one or more of the first riser 405, second riser 410, first stripper 415, second stripper 420, first knock out drum 425, and regenerator 430 can be part of a preexisting catalytic cracking system. A separation section of a preexisting catalytic cracking system can also be used, along with existing pieces of equipment such as air blowers, gas compressors, pumps, and the like. The preexisting catalytic cracking system can be retrofit for processing solid biomass particles. Retrofitting can include adding the catalyst cooler 435, kneader 440, tower 450, third riser 455, and second knock out drum 460. Retrofitting can include modulating the operating parameters of one or more components of the preexisting catalytic cracking system.

The system 400 shown in FIG. 4 is similar to the system 300 shown in FIG. 3, except that the system 400 includes the third riser 455 and second knock out drum 460 instead of the cyclone pretreater 345. Thus, in system 400, particle size reduction and drying is facilitated by the third riser 455 and second knock out drum 460 instead of the cyclone pretreater 345.

The kneader 440 functions substantially as, and can include any of the features of, the kneaders 240 and 340.

The third riser 455 can receive the kneaded biomass from the kneader 440, and agitate the solid biomass particles. The third riser 455 can also receive fresh FCC catalyst and/or cool recycled catalyst. Agitating the solid biomass particles can reduce the sizes of the solid biomass particles (e.g., the third riser 455 can receive a gas that conveys the solid biomass particles). In various embodiments, the solid particles are reduced to a size sufficient to be dissolved or suspended in a liquid feedstock (e.g., biomass, conventional, or mixtures thereof). In some embodiments, the solid biomass particles are reduced to a size sufficient that the solid biomass particles flow like a liquid and can be gravity-fed into a subsequent reaction vessel. The third riser 455 can dry the solid biomass particles. Drying can be facilitated by heating the solid biomass particles. However, the third riser 455 can be operated a temperature (e.g., below about 150, 150, 170, 180, 190, or 200° C.) lower than the temperature of the first riser 405 and the second riser 410, to mitigate undesired conversion of the biomass. Drying can also be facilitated by the mechanical action agitation. The water and/or other solvent can be vented and/or drained.

The second knock out drum 460 can receive the solid biomass particles from the third riser 455. The second knock out drum 460 can include any of the features of the first knock out drums 125 and 225 and 325. For example, the second knock out drum 460 can separate and remove a hydrophobic portion of the fraction, which can be a product (e.g., fuel, specialty chemical) or an intermediate to be subjected to further processing (e.g., provided to the tower 450). The second knock out drum 460 can also separate a gas portion, which can include product (e.g., light gas, LPG) and/or other gases (e.g., $H_2O$, $CO$, $CO_2$). The second knock out drum 460 also dries the biomass particles.

The first riser 405 can receive the activated biomass from the second knock out drum 460.

The first riser 405, second riser 410, first stripper 415, second stripper 420, first knock out drum 425, regenerator 430, and tower 450 can include any of the features of the first risers 105 and 305, second risers 110 and 210 and 310, first strippers 115 and 215 and 315, second strippers 120 and 220 and 320, first knock out drums 125 and 225 and 325, regenerators 130 and 230 and 330, and tower 350, respectively.

The catalyst cooler 435 can receive hot regenerated catalyst from the regenerator 430, and cool the catalyst. The cooled catalyst can be reintroduced into the system 400 in the first riser 405 and/or the third riser 455. The catalyst cooler 335 can include any of the features of the catalyst coolers 135 and 335.

A reactor can operate in either a continuous or switching (e.g., swing reactor) fashion. For example, each train of the refinery unit (e.g., hydroprocessing, hydrocracking unit) can be proceeded by a pair of switchable guard reactors, so that catalyst in the reactor not in operation can be replaced to remove contaminants without allowing a disruptive pressure drop to occur. A guard reactor can include a system for removing and replacing spent catalyst with fresh catalyst (e.g., an ebulating bed reactor with a system to remove spent catalyst and a system to add fresh catalyst). Where the reactor is operated in a continuous fashion, the catalyst can be continuously replaced or regenerated. A guard reactor can help extend catalyst life in the main reactor, by limiting catalyst deactivation due to contaminants substantially to the guard reactor.

In some cases, selecting a biomass feedstock having a relatively low mineral content (e.g., essentially cellulose) or de-mineralizing the biomass feedstock (e.g., by pre-processing) can mitigate the need to replace or regenerate the catalyst. Where the reactor is operated in a switching fashion, it can be important to limit the mineral content of the biomass feedstock to ensure sufficient catalytic activity throughout a reaction cycle. A guard reaction can also be employed to mitigate inactivation of the hydro treating catalyst by minerals in the biomass feedstock. Catalyst (e.g., in a guard reactor) can be selected to have a greater than average macroporous region pore volume, so that it can tolerate a greater quantity of contaminants before becoming inactivated. To some degree, sufficient catalytic activity can be ensured by selecting more active catalyst or providing more catalyst.

While the technology has been particularly shown and described with reference to specific embodiments, it should be understood by those skilled in the art that various changes in form and detail may be made without departing from the spirit and scope of the technology as defined by the appended claims.

What is claimed:

1. A biomass-conventional feedstock composition for processing in a conventional refinery unit, the biomass-conventional feedstock composition consisting essentially of:
   a biomass-catalyst mixture comprising a plurality of solid biomass particles and a catalyst, wherein the plurality of solid biomass particles are substantially characterized by individual sizes below about 1500 microns; and
   a conventional petroleum feedstock.

2. The biomass feedstock composition of claim 1 wherein said solid biomass particles are derived from inedible biomass.

3. The biomass feedstock composition of claim 2 wherein said inedible biomass comprises a component selected from the group consisting of agricultural waste, an energy crop, forestry waste, trees, woodchips, algae, and combinations thereof.

4. The biomass feedstock composition of claim 3 wherein said inedible biomass comprises wood chips.

5. The biomass feedstock composition of claim 1 wherein said solid biomass particles comprise a component selected from the group consisting of lignin, amorphous hemi-cellulose, crystalline cellulose, and combinations thereof.

6. The biomass feedstock composition of claim 1 wherein the plurality of solid biomass particles are substantially characterized by individual sizes below about 1000 microns.

7. The biomass feedstock composition of claim 1 wherein the plurality of solid biomass particles are substantially characterized by an average size between about 50 and about 70 microns.

8. The biomass feedstock composition of claim 1 wherein the catalyst comprises a component selected from the group consisting of a group I element, a group II element, Fe, Mg, an inorganic oxide, a catalytic clay, silica, and combinations thereof.

9. The biomass feedstock composition of claim 8 wherein said catalyst comprises the inorganic oxide which is selected from the group consisting of a refractory inorganic oxide, clay, hydrotalcite, crystalline aluminosilicate, layered hydroxyl-salt, and combinations thereof.

10. The biomass feedstock composition of claim 9 wherein the refractory inorganic oxide is selected from the group consisting of alumina, silica, silica-alumina, titania, zirconia, zeolite and combinations thereof.

11. The biomass feedstock composition of claim 1 wherein at least a portion of the solid biomass particles are impregnated with the catalyst.

12. The biomass feedstock composition of claim 1 wherein the catalyst comprises a metal in a form selected from the group consisting of metallic, oxide, hydroxide, hydroxyl oxide, salt, a metallo-organic compound, and combinations thereof.

13. The biomass feedstock composition of claim 12 wherein the metal is selected from the group consisting of iron, zinc, copper, nickel, manganese, and combinations thereof.

14. The biomass feedstock composition of claim 1 wherein the solid biomass particles are at least partially demineralized prior to becoming a part of the biomass-catalyst mixture.

* * * * *